United States Patent
Zhang et al.

(10) Patent No.: US 12,451,324 B2
(45) Date of Patent: Oct. 21, 2025

(54) LEVELING SENSOR IN MULTIPLE CHARGED-PARTICLE BEAM INSPECTION

(71) Applicant: ASML Netherlands B.V., Veldhoven (NL)

(72) Inventors: Jian Zhang, San Jose, CA (US); Yan Wang, San Jose, CA (US); Liang Tang, San Jose, CA (US); Yixiang Wang, Fremont, CA (US)

(73) Assignee: ASML Netherlands B.V., Veldhoven (NL)

( * ) Notice: Subject to any disclaimer, the term of this patent is extended or adjusted under 35 U.S.C. 154(b) by 405 days.

(21) Appl. No.: 17/911,398

(22) PCT Filed: Feb. 25, 2021

(86) PCT No.: PCT/EP2021/054623
§ 371 (c)(1),
(2) Date: Sep. 13, 2022

(87) PCT Pub. No.: WO2021/180473
PCT Pub. Date: Sep. 16, 2021

(65) Prior Publication Data
US 2023/0096657 A1   Mar. 30, 2023

Related U.S. Application Data

(60) Provisional application No. 62/989,488, filed on Mar. 13, 2020.

(51) Int. Cl.
*H01J 37/20* (2006.01)
*G01B 11/06* (2006.01)
(Continued)

(52) U.S. Cl.
CPC .......... *H01J 37/20* (2013.01); *G01B 11/0608* (2013.01); *H01J 37/21* (2013.01);
(Continued)

(58) Field of Classification Search
CPC .......... H01J 37/20; H01J 37/21; H01J 37/222; H01J 37/244; H01J 2237/20292;
(Continued)

(56) References Cited

U.S. PATENT DOCUMENTS 6,960,767 B1 * 11/2005 Do .......................... H01J 37/21
250/397
7,139,083 B2   11/2006 Fielden et al.
(Continued)

FOREIGN PATENT DOCUMENTS

| CN | 1499493 A | 5/2004 |
| CN | 107329246 A | 11/2017 |

(Continued)

OTHER PUBLICATIONS

Office Action of the Intellectual Property Office issued in related Taiwanese Patent Application No. 110108434; mailed Apr. 6, 2022 (10 pgs.).

(Continued)

*Primary Examiner* — David A Vanore
(74) *Attorney, Agent, or Firm* — FINNEGAN, HENDERSON, FARABOW, GARRETT & DUNNER LLP

(57) ABSTRACT

An improved leveling sensor and method for adjusting a sample height in a charged-particle beam inspection system are disclosed. An improved leveling sensor comprises a light source configured to project a first pattern onto a sample and a detector configured to capture an image of a projected pattern after the first pattern is projected on the sample. The first pattern can comprise an irregularity to enable a determination of a vertical displacement of the sample.

19 Claims, 13 Drawing Sheets

(51) Int. Cl.
*H01J 37/21* (2006.01)
*H01J 37/22* (2006.01)
*H01J 37/244* (2006.01)

(52) U.S. Cl.
CPC .......... *H01J 37/222* (2013.01); *H01J 37/244* (2013.01); *H01J 2237/20292* (2013.01); *H01J 2237/24578* (2013.01); *H01J 2237/2482* (2013.01); *H01J 2237/2817* (2013.01)

(58) Field of Classification Search
CPC ..... H01J 2237/24578; H01J 2237/2482; H01J 2237/2817; G01B 11/0608
See application file for complete search history.

(56) References Cited

U.S. PATENT DOCUMENTS

| | | | | |
|---|---|---|---|---|
| 9,830,524 | B2* | 11/2017 | Sekiguchi | G01B 15/04 |
| 10,641,607 | B2* | 5/2020 | Sekiguchi | H01J 37/226 |
| 11,754,388 | B2* | 9/2023 | Aida | H01J 37/3007 |
| | | | | 250/492.1 |
| 11,959,735 | B2* | 4/2024 | Nakai | H01J 37/265 |
| 2003/0007677 | A1* | 1/2003 | Hiroi | G06T 7/001 |
| | | | | 382/149 |
| 2003/0201393 | A1 | 10/2003 | Tsuneta et al. | |
| 2005/0103746 | A1* | 5/2005 | Nadeau | G11B 5/3163 |
| | | | | 216/62 |
| 2005/0173633 | A1* | 8/2005 | Tanaka | G01N 23/2251 |
| | | | | 250/311 |
| 2006/0060781 | A1* | 3/2006 | Watanabe | B82Y 40/00 |
| | | | | 250/310 |
| 2006/0192118 | A1* | 8/2006 | Tashiro | H01J 37/20 |
| | | | | 250/310 |
| 2007/0109557 | A1* | 5/2007 | Saito | H01J 37/20 |
| | | | | 356/602 |
| 2008/0302974 | A1 | 12/2008 | Wang et al. | |
| 2011/0260055 | A1* | 10/2011 | Wang | G01N 23/20058 |
| | | | | 356/612 |
| 2015/0177625 | A1 | 6/2015 | De Boer et al. | |
| 2019/0320097 | A1 | 10/2019 | Li et al. | |
| 2021/0254964 | A1* | 8/2021 | Taniguchi | H01J 37/20 |
| 2022/0107176 | A1* | 4/2022 | Wang | H01J 37/222 |
| 2022/0308331 | A1* | 9/2022 | Kanzaki | G02B 21/244 |
| 2024/0127426 | A1* | 4/2024 | Hwang | G06T 7/60 |

FOREIGN PATENT DOCUMENTS

| | | |
|---|---|---|
| CN | 108548490 A | 9/2018 |
| JP | 2016-033461 A | 3/2016 |
| JP | 2017-111011 A | 6/2017 |
| TW | I462143 | 11/2014 |
| TW | 201937130 A | 9/2019 |
| TW | I670685 | 9/2019 |
| TW | 202004369 A | 1/2020 |
| WO | WO 2017/022004 A1 | 2/2017 |
| WO | WO 2019/063433 A1 | 4/2019 |

OTHER PUBLICATIONS

Anonymous: "Cross-correlation—Wikipedia", Mar. 4, 2020 (Mar. 4, 2020), pp. 1-7, XP055808938, Retrieved from the Internet: URL:https://web.archive.org/web/20200304220127/https://en.wikipedia.org/wiki/Cross-correlation.

* cited by examiner

LEVELING SENSOR IN MULTIPLE CHARGED-PARTICLE BEAM INSPECTION

CROSS-REFERENCE TO RELATED APPLICATIONS

This application claims priority to International Application No. PCT/EP2021/054623, filed Feb. 25, 2021, and published as WO 2021/180473 A1, which claims priority of U.S. application 62/989,488 which was filed on Mar. 13, 2020. The contents of these applications are incorporated herein by reference in their entireties.

TECHNICAL FIELD

The embodiments provided herein relate to a leveling sensor, and more particularly to a phase out projection pattern of a leveling sensor in a multiple charged-particle beam inspection.

BACKGROUND

In manufacturing processes of integrated circuits (ICs), unfinished or finished circuit components are inspected to ensure that they are manufactured according to design and are free of defects. Inspection systems utilizing optical microscopes or charged particle (e.g., electron) beam microscopes, such as a scanning electron microscope (SEM) can be employed. As the physical sizes of IC components continue to shrink, accuracy and yield in defect detection become more important.

However, imaging resolution and throughput of inspection tools struggles to keep pace with the ever-decreasing feature size of IC components. The accuracy, resolution, and throughput of such inspection tools may be limited by lack of accuracy in detecting a wafer displacement.

SUMMARY

The embodiments provided herein disclose a particle beam inspection apparatus, and more particularly, an inspection apparatus using a plurality of charged particle beams.

In some embodiments, a charged-particle beam inspection system comprises a stage configured to hold a sample and a leveling sensor configured to determine a vertical displacement of the sample. The leveling sensor comprises a light source configured to project a first pattern onto the sample and a detector configured to capture an image of a projected pattern after the first pattern is projected on the sample. The first pattern comprises an irregularity to enable a determination of the vertical displacement of the sample.

In some embodiments, a method for adjusting a sample height in a charged-particle beam inspection system comprising a leveling sensor is provided. The method comprises generating a light intensity image of a projected pattern on a sample, wherein the projected pattern is formed by projecting a first pattern on the sample by a light source of the leveling sensor, conducting a cross-correlation between the light intensity image and a reference image, and determining a vertical displacement of the sample based on the cross-correlation. The first pattern comprises an irregularity to enable a determination of the vertical displacement of the sample.

In some embodiments, a non-transitory computer readable medium that stores a set of instructions that is executable by at least one processor of a computing device to cause the computing device to perform a method for adjusting a sample height in a charged-particle beam inspection system comprising a leveling sensor is disclosed. The method comprises generating a light intensity image of a projected pattern on a sample, wherein the projected pattern is formed by projecting a first pattern on the sample by a light source of the leveling sensor, conducting a cross-correlation between the light intensity image and a reference image, and determining a vertical displacement of the sample based on the cross-correlation. The first pattern comprises an irregularity to enable a determination of the vertical displacement of the sample.

In some embodiments, a leveling sensor comprises a light source configured to project a first pattern onto a sample and a detector configured to capture an image of a projected pattern after the first pattern is projected on the sample. The first pattern can comprise an irregularity to enable a determination of a vertical displacement of the sample.

Other advantages of the embodiments of the present disclosure will become apparent from the following description taken in conjunction with the accompanying drawings wherein are set forth, by way of illustration and example, certain embodiments of the present invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the disclosed embodiments as recited in the appended claims. For example, although some embodiments are described in the context of utilizing electron beams, the disclosure is not so limited. Other types of charged particle beams may be similarly applied. Furthermore, other imaging systems may be used, such as optical imaging, photo detection, x-ray detection, etc.

Electronic devices are constructed of circuits formed on a piece of silicon called a substrate. Many circuits may be formed together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than 1/1000th the size of a human hair.

Making these extremely small ICs is a complex, time-consuming, and expensive process, often involving hundreds of individual steps. Errors in even one step have the potential to result in defects in the finished IC rendering it useless. Thus, one goal of the manufacturing process is to avoid such defects to maximize the number of functional ICs made in the process, that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection can be carried out using a scanning electron microscope (SEM). An SEM can be used to image these extremely small structures, in effect, taking a "picture" of the structures. The image can be used to determine if the structure was formed properly and also if it was formed in the proper location. If the structure is defective, then the process can be adjusted so the defect is less likely to recur.

Figure 2:
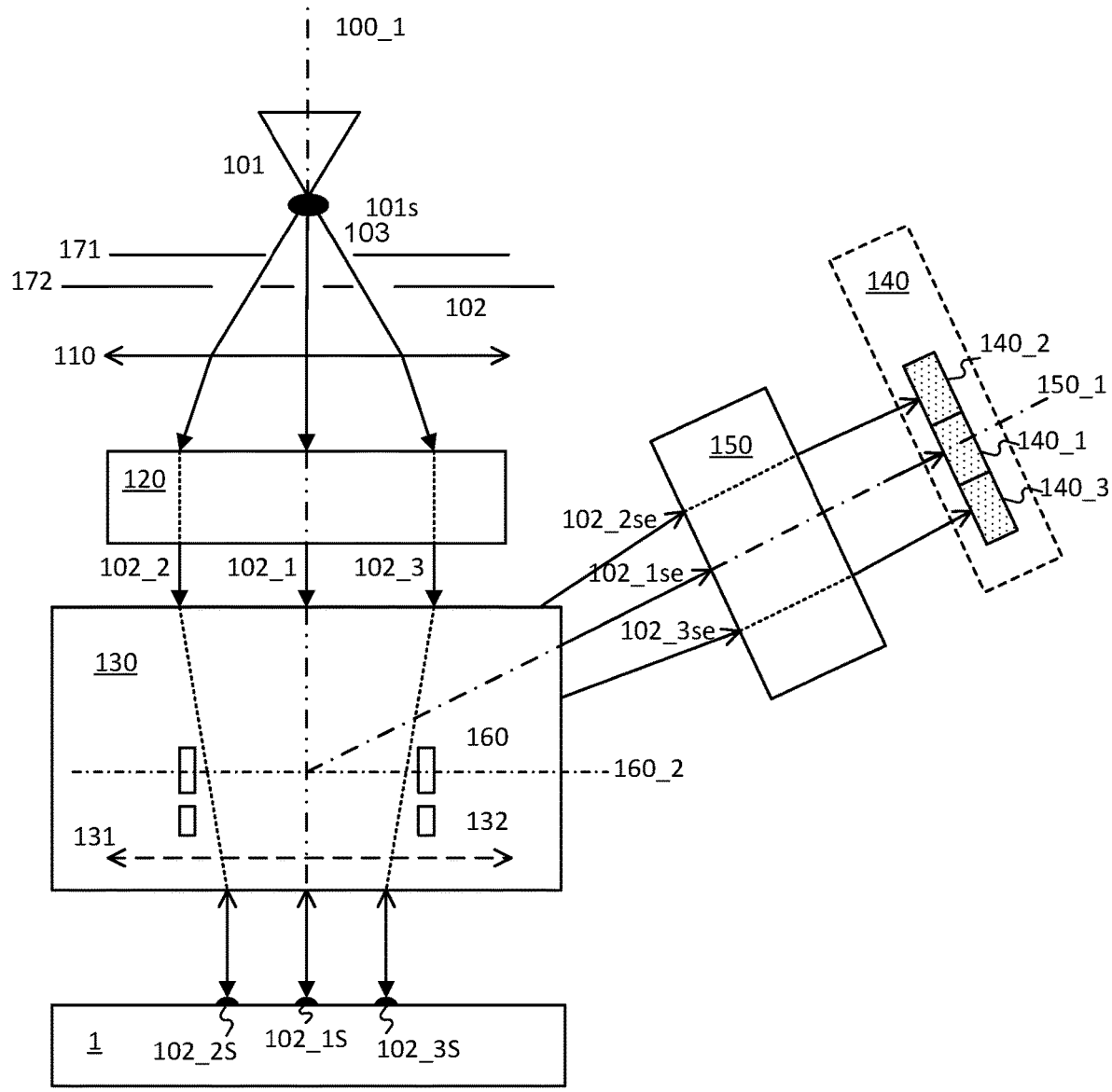
FIG. 2 is a schematic diagram illustrating an example electron beam tool that can be a part of the electron beam inspection system of FIG. 1, consistent with embodiments of the present disclosure.

In an electron beam inspection system, a leveling sensor (or Z-sensor) detects a height variation of an inspection sample to maintain the inspection sample at a target height and to keep the inspection sample at the focus of a primary electron beam (e.g., 102 of FIG. 2). As the physical sizes of IC components decreases and a quality of an inspection image (e.g., SEM image) can significantly degrade with a slight displacement (e.g., tens of nanometers) between a beam focus and a sample height, highly sensitive detection of a height displacement of the sample is required.

Embodiments of the present disclosure provide a technique for detecting a height displacement of a sample with high accuracy by using a phase out optical pattern that comprises an irregularity such as a variable period, local phase out feature, etc. A phase out optical pattern in a leveling sensor can enhance a resistance to noise and thus enables detecting a vertical displacement of a sample with high accuracy and efficiency.

Relative dimensions of components in drawings may be exaggerated for clarity. Within the following description of drawings, the same or like reference numbers refer to the same or like components or entities, and only the differences with respect to the individual embodiments are described. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Figure 1:
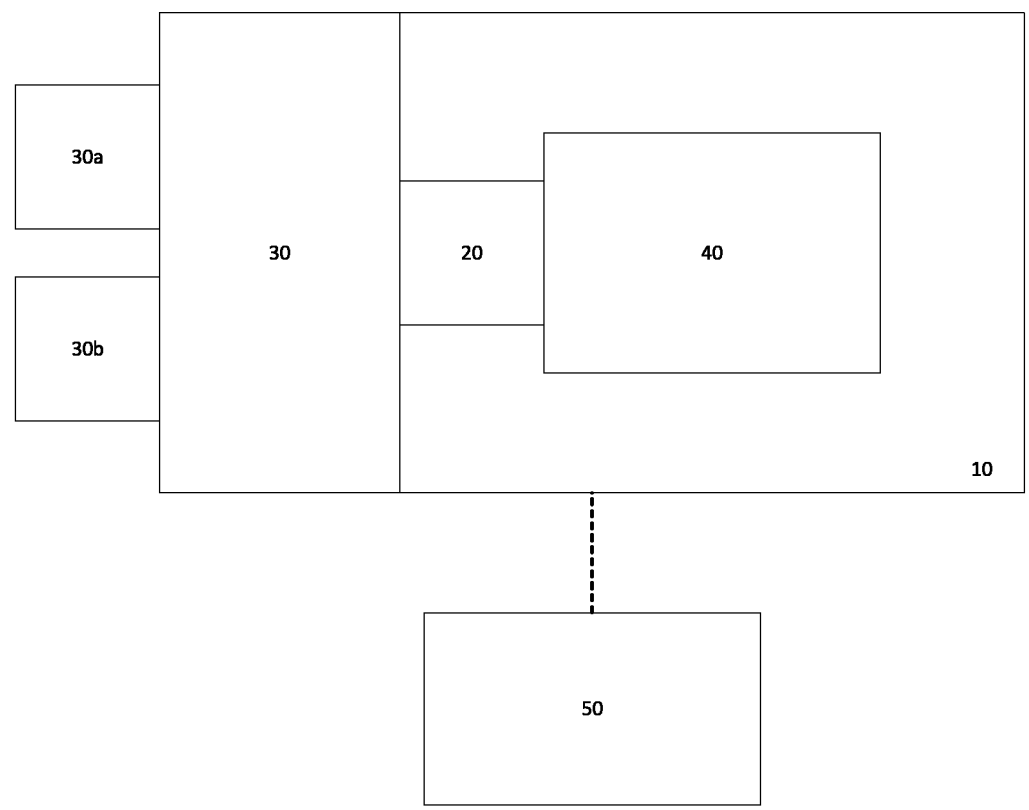
FIG. 1 is a schematic diagram illustrating an example electron beam inspection (EBI) system, consistent with embodiments of the present disclosure.

Reference is now made to FIG. 1, which illustrates an example electron beam inspection (EBI) system 100 consistent with embodiments of the present disclosure. As shown in FIG. 1, charged particle beam inspection system 100 includes a main chamber 10, a load-lock chamber 20, an electron beam tool 40, and an equipment front end module (EFEM) 30. Electron beam tool 40 is located within main chamber 10. While the description and drawings are directed to an electron beam, it is appreciated that the embodiments are not used to limit the present disclosure to specific charged particles.

EFEM 30 includes a first loading port 30a and a second loading port 30b. EFEM 30 may include additional loading port(s). First loading port 30a and second loading port 30b receive wafer front opening unified pods (FOUPs) that contain wafers (e.g., semiconductor wafers or wafers made of other material(s)) or samples to be inspected (wafers and samples are collectively referred to as "wafers" hereafter). One or more robot arms (not shown) in EFEM 30 transport the wafers to load-lock chamber 20.

Load-lock chamber 20 is connected to a load/lock vacuum pump system (not shown), which removes gas molecules in load-lock chamber 20 to reach a first pressure below the atmospheric pressure. After reaching the first pressure, one or more robot arms (not shown) transport the wafer from load-lock chamber 20 to main chamber 10. Main chamber 10 is connected to a main chamber vacuum pump system (not shown), which removes gas molecules in main chamber 10 to reach a second pressure below the first pressure. After reaching the second pressure, the wafer is subject to inspection by electron beam tool 40. In some embodiments, electron beam tool 40 may comprise a single-beam inspection tool. In other embodiments, electron beam tool 40 may comprise a multi-beam inspection tool.

Controller 50 may be electronically connected to electron beam tool 40 and may be electronically connected to other components as well. Controller 50 may be a computer configured to execute various controls of charged particle beam inspection system 100. Controller 50 may also include processing circuitry configured to execute various signal and image processing functions. While controller 50 is shown in FIG. 1 as being outside of the structure that includes main chamber 10, load-lock chamber 20, and EFEM 30, it is appreciated that controller 50 can be part of the structure.

While the present disclosure provides examples of main chamber 10 housing an electron beam inspection system, it should be noted that aspects of the disclosure in their broadest sense, are not limited to a chamber housing an electron beam inspection system. Rather, it is appreciated that the foregoing principles may be applied to other chambers as well.

Reference is now made to FIG. 2, which illustrates a schematic diagram illustrating an example electron beam tool 40 that can be a part of the example charged particle beam inspection system 100 of FIG. 1, consistent with embodiments of the present disclosure. An electron beam tool 40 (also referred to herein as apparatus 40) comprises an electron source 101, a gun aperture plate 171 with a gun aperture 103, a pre-beamlet forming mechanism 172, a condenser lens 110, a source conversion unit 120, a primary projection optical system 130, a sample stage (not shown in FIG. 2), a secondary imaging system 150, and an electron detection device 140. Primary projection optical system 130 can comprise an objective lens 131. Electron detection device 140 can comprise a plurality of detection elements

140_1, 140_2, and 140_3. Beam separator 160 and deflection scanning unit 132 can be placed inside primary projection optical system 130. It may be appreciated that other commonly known components of apparatus 40 may be added/omitted as appropriate.

Electron source 101, gun aperture plate 171, condenser lens 110, source conversion unit 120, beam separator 160, deflection scanning unit 132, and primary projection optical system 130 can be aligned with a primary optical axis 100_1 of apparatus 100. Secondary imaging system 150 and electron detection device 140 can be aligned with a secondary optical axis 150_1 of apparatus 40.

Electron source 101 can comprise a cathode, an extractor or an anode, wherein primary electrons can be emitted from the cathode and extracted or accelerated to form a primary electron beam 102 that forms a crossover (virtual or real) 101s. Primary electron beam 102 can be visualized as being emitted from crossover 101s.

Source conversion unit 120 may comprise an image-forming element array (not shown in FIG. 2), an aberration compensator array (not shown), a beam-limit aperture array (not shown), and a pre-bending micro-deflector array (not shown). The image-forming element array can comprise a plurality of micro-deflectors or micro-lenses to form a plurality of parallel images (virtual or real) of crossover 101s with a plurality of beamlets of primary electron beam 102. FIG. 2 shows three beamlets 102_1, 102_2, and 102_3 as an example, and it is appreciated that the source conversion unit 120 can handle any number of beamlets.

In some embodiments, source conversion unit 120 may be provided with beam-limit aperture array and image-forming element array (both are not shown). The beam-limit aperture array may comprise beam-limit apertures. It is appreciated that any number of apertures may be used, as appropriate. Beam-limit apertures may be configured to limit sizes of beamlets 102_1, 102_2, and 102_3 of primary-electron beam 102. The image-forming element array may comprise image-forming deflectors (not shown) configured to deflect beamlets 102_1, 102_2, and 102_3 by varying angles towards primary optical axis 100_1. In some embodiments, deflectors further away from primary optical axis 100_1 may deflect beamlets to a greater extent. Furthermore, image-forming element array may comprise multiple layers (not illustrated), and deflectors may be provided in separate layers. Deflectors may be configured to be individually controlled independent from one another. In some embodiments, a deflector may be controlled to adjust a pitch of probe spots (e.g., 102_1S, 102_2S, and 102_3S) formed on a surface of sample 1. As referred to herein, pitch of the probe spots may be defined as the distance between two immediately adjacent probe spots on the surface of sample 1.

A centrally located deflector of image-forming element array may be aligned with primary optical axis 100_1 of electron beam tool 40. Thus, in some embodiments, a central deflector may be configured to maintain the trajectory of beamlet 102_1 to be straight. In some embodiments, the central deflector may be omitted. However, in some embodiments, primary electron source 101 may not necessarily be aligned with the center of source conversion unit 120. Furthermore, it is appreciated that while FIG. 2 shows a side view of apparatus 40 where beamlet 102_1 is on primary optical axis 100_1, beamlet 102_1 may be off primary optical axis 100_1 when viewed from a different side. That is, in some embodiments, all of beamlets 102_1, 102_2, and 102_3 may be off-axis. An off-axis component may be offset relative to primary optical axis 100_1.

The deflection angles of the deflected beamlets may be set based on one or more criteria. In some embodiments, deflectors may deflect off-axis beamlets radially outward or away (not illustrated) from primary optical axis 100_1. In some embodiments, deflectors may be configured to deflect off-axis beamlets radially inward or towards primary optical axis 100_1. Deflection angles of the beamlets may be set so that beamlets 102_1, 102_2, and 102_3 land perpendicularly on sample 1. Off-axis aberrations of images due to lenses, such as objective lens 131, may be reduced by adjusting paths of the beamlets passing through the lenses. Therefore, deflection angles of off-axis beamlets 102_2 and 102_3 may be set so that probe spots 102_2S and 102_3S have small aberrations. Beamlets may be deflected so as to pass through or close to the front focal point of objective lens 131 to decrease aberrations of off-axis probe spots 102_2S and 102_3S. In some embodiments, deflectors may be set to make beamlets 102_1, 102_2, and 102_3 land perpendicularly on sample 1 while probe spots 102_1S, 102_2S, and 102_3S have small aberrations.

Condenser lens 110 is configured to focus primary electron beam 102. The electric currents of beamlets 102_1, 102_2, and 102_3 downstream of source conversion unit 120 can be varied by adjusting the focusing power of condenser lens 110 or by changing the radial sizes of the corresponding beam-limit apertures within the beam-limit aperture array. The electric currents may be changed by both, altering the radial sizes of beam-limit apertures and the focusing power of condenser lens 110. Condenser lens 110 may be an adjustable condenser lens that may be configured so that the position of its first principle plane is movable. The adjustable condenser lens may be configured to be magnetic, which may result in off-axis beamlets 102_2 and 102_3 illuminating source conversion unit 120 with rotation angles. The rotation angles may change with the focusing power or the position of the first principal plane of the adjustable condenser lens. Accordingly, condenser lens 110 may be an anti-rotation condenser lens that may be configured to keep the rotation angles unchanged while the focusing power of condenser lens 110 is changed. In some embodiments, condenser lens 110 may be an adjustable anti-rotation condenser lens, in which the rotation angles do not change when the focusing power and the position of the first principal plane of condenser lens 110 are varied.

Electron beam tool 40 may comprise pre-beamlet forming mechanism 172. In some embodiments, electron source 101 may be configured to emit primary electrons and form a primary electron beam 102. In some embodiments, gun aperture plate 171 may be configured to block off peripheral electrons of primary electron beam 102 to reduce the Coulomb effect. In some embodiments, pre-beamlet-forming mechanism 172 further cuts the peripheral electrons of primary electron beam 102 to further reduce the Coulomb effect. Primary-electron beam 102 may be trimmed into three primary electron beamlets 102_1, 102_2, and 102_3 (or any other number of beamlets) after passing through pre-beamlet forming mechanism 172. Electron source 101, gun aperture plate 171, pre-beamlet forming mechanism 172, and condenser lens 110 may be aligned with a primary optical axis 100_1 of electron beam tool 40.

Pre-beamlet forming mechanism 172 may comprise a Coulomb aperture array. A center aperture, also referred to herein as the on-axis aperture, of pre-beamlet-forming mechanism 172 and a central deflector of source conversion unit 120 may be aligned with primary optical axis 100_1 of electron beam tool 40. Pre-beamlet-forming mechanism 172 may be provided with a plurality of pre-trimming apertures (e.g., a Coulomb aperture array). In FIG. 2, the three beamlets 102_1, 102_2 and 102_3 are generated when primary electron beam 102 passes through the three pre-trimming apertures, and much of the remaining part of primary electron beam 102 is cut off. That is, pre-beamlet-forming mechanism 172 may trim much or most of the electrons from primary electron beam 102 that do not form the three beamlets 102_1, 102_2 and 102_3. Pre-beamlet-forming mechanism 172 may cut off electrons that will ultimately not be used to form probe spots 102_1S, 102_2S and 102_3S before primary electron beam 102 enters source conversion unit 120. In some embodiments, a gun aperture plate 171 may be provided close to electron source 101 to cut off electrons at an early stage, while pre-beamlet forming mechanism 172 may also be provided to further cut off electrons around a plurality of beamlets. Although FIG. 2 demonstrates three apertures of pre-beamlet forming mechanism 172, it is appreciated that there may be any number of apertures, as appropriate.

In some embodiments, pre-beamlet forming mechanism 172 may be placed below condenser lens 110. Placing pre-beamlet forming mechanism 172 closer to electron source 101 may more effectively reduce the Coulomb effect. In some embodiments, gun aperture plate 171 may be omitted when pre-beamlet forming mechanism 172 is able to be located sufficiently close to source 101 while still being manufacturable.

Objective lens 131 may be configured to focus beamlets 102_1, 102_2, and 102_3 onto a sample 1 for inspection and can form three probe spots 102_1s, 102_2s, and 102_3s on surface of sample 1. Gun aperture plate 171 can block off peripheral electrons of primary electron beam 102 not in use to reduce Coulomb interaction effects. Coulomb interaction effects can enlarge the size of each of probe spots 102_1s, 102_2s, and 102_3s, and therefore deteriorate inspection resolution.

Beam separator 160 may be a beam separator of Wien filter type comprising an electrostatic deflector generating an electrostatic dipole field E1 and a magnetic dipole field B1 (both of which are not shown in FIG. 2). If they are applied, the force exerted by electrostatic dipole field E1 on an electron of beamlets 102_1, 102_2, and 102_3 is equal in magnitude and opposite in direction to the force exerted on the electron by magnetic dipole field B1. Beamlets 102_1, 102_2, and 102_3 can therefore pass straight through beam separator 160 with zero deflection angles.

Deflection scanning unit 132 can deflect beamlets 102_1, 102_2, and 102_3 to scan probe spots 102_1s, 102_2s, and 102_3s over three small scanned areas in a section of the surface of sample 1. In response to incidence of beamlets 102_1, 102_2, and 102_3 at probe spots 102_1s, 102_2s, and 102_3s, three secondary electron beams 102_1se, 102_2se, and 102_3se may be emitted from sample 1. Each of secondary electron beams 102_1se, 102_2se, and 102_3se can comprise electrons with a distribution of energies including secondary electrons (energies ≤50 eV) and back-scattered electrons (energies between 50 eV and landing energies of beamlets 102_1, 102_2, and 102_3). Beam separator 160 can direct secondary electron beams 102_1se, 102_2se, and 102_3se towards secondary imaging system 150. Secondary imaging system 150 can focus secondary electron beams 102_1se, 102_2se, and 102_3se onto detection elements 140_1, 140_2, and 140_3 of electron detection device 140. Detection elements 140_1, 140_2, and 140_3 can detect corresponding secondary electron beams 102_1se, 102_2se, and 102_3se and generate corresponding signals used to construct images of the corresponding scanned areas of sample 1.

In FIG. 2, three secondary electron beams 102_1se, 102_2se, and 102_3se respectively generated by three probe spots 102_1S, 102_2S, and 102_3S, travel upward towards electron source 101 along primary optical axis 100_1, pass through objective lens 131 and deflection scanning unit 132 in succession. The three secondary electron beams 102_1se, 102_2se and 102_3se are diverted by beam separator 160 (such as a Wien Filter) to enter secondary imaging system 150 along secondary optical axis 150_1 thereof. Secondary imaging system 150 focuses the three secondary electron beams 102_1se~102_3se onto electron detection device 140 which comprises three detection elements 140_1, 140_2, and 140_3. Therefore, electron detection device 140 can simultaneously generate the images of the three scanned regions scanned by the three probe spots 102_1S, 102_2S and 102_3S, respectively. In some embodiments, electron detection device 140 and secondary imaging system 150 form one detection unit (not shown). In some embodiments, the electron optics elements on the paths of secondary electron beams such as, but not limited to, objective lens 131, deflection scanning unit 132, beam separator 160, secondary imaging system 150 and electron detection device 140, may form one detection system.

In some embodiments, controller 50 may comprise an image processing system that includes an image acquirer (not shown) and a storage (not shown). The image acquirer may comprise one or more processors. For example, the image acquirer may comprise a computer, server, mainframe host, terminals, personal computer, any kind of mobile computing devices, and the like, or a combination thereof. The image acquirer may be communicatively coupled to electron detection device 140 of apparatus 40 through a medium such as an electrical conductor, optical fiber cable, portable storage media, IR, Bluetooth, internet, wireless network, wireless radio, among others, or a combination thereof. In some embodiments, the image acquirer may receive a signal from electron detection device 140 and may construct an image. The image acquirer may thus acquire images of sample 1. The image acquirer may also perform various post-processing functions, such as generating contours, superimposing indicators on an acquired image, and the like. The image acquirer may be configured to perform adjustments of brightness and contrast, etc. of acquired images. In some embodiments, the storage may be a storage medium such as a hard disk, flash drive, cloud storage, random access memory (RAM), other types of computer readable memory, and the like. The storage may be coupled with the image acquirer and may be used for saving scanned raw image data as original images, and post-processed images.

In some embodiments, the image acquirer may acquire one or more images of a sample based on one or more imaging signals received from electron detection device 140. An imaging signal may correspond to a scanning operation for conducting charged particle imaging. An acquired image may be a single image comprising a plurality of imaging areas or may involve multiple images. The single image may be stored in the storage. The single image may be an original image that may be divided into a plurality of regions. Each of the regions may comprise one imaging area containing a feature of sample 1. The acquired images may comprise multiple images of a single imaging area of sample 1 sampled multiple times over a time sequence or may comprise multiple images of different imaging areas of sample 1. The multiple images may be stored in the storage. In some embodiments, controller 50 may be configured to perform image processing steps with the multiple images of the same location of sample 1.

In some embodiments, controller 50 may include measurement circuitries (e.g., analog-to-digital converters) to obtain a distribution of the detected secondary electrons. The electron distribution data collected during a detection time window, in combination with corresponding scan path data of each of primary beamlets 102_1, 102_2, and 102_3 incident on the wafer surface, can be used to reconstruct images of the wafer structures under inspection. The reconstructed images can be used to reveal various features of the internal or external structures of sample 1, and thereby can be used to reveal any defects that may exist in the wafer.

In some embodiments, controller 50 may control a motorized stage (not shown) to move sample 1 during inspection. In some embodiments, controller 50 may enable the motorized stage to move sample 1 in a direction continuously at a constant speed. In other embodiments, controller 50 may enable the motorized stage to change the speed of the movement of sample 1 over time depending on the steps of scanning process. In some embodiments, controller 50 may adjust a configuration of primary projection optical system 130 or secondary imaging system 150 based on images of secondary electron beams 102_1se, 102_2se, and 102_3se.

Although FIG. 2 shows that electron beam tool 40 uses three primary electron beams, it is appreciated that electron beam tool 40 may use two or more number of primary electron beams. The present disclosure does not limit the number of primary electron beams used in apparatus 40.

Figure 3A:
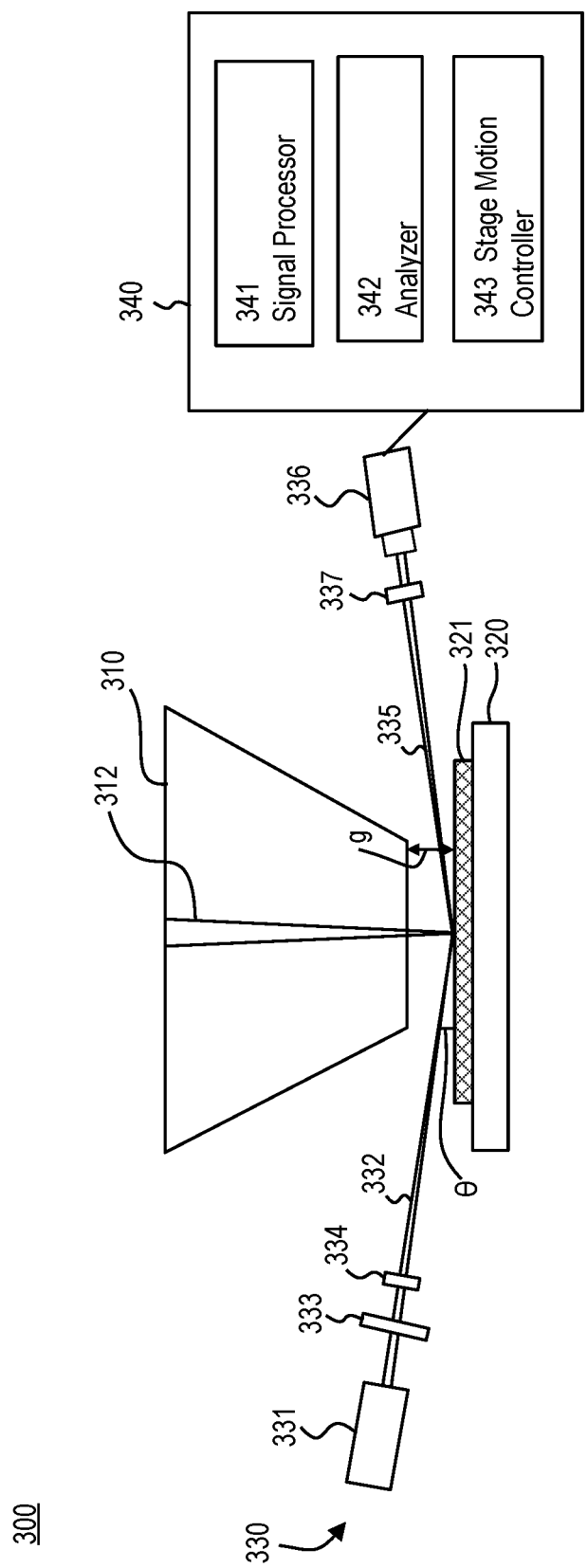
FIG. 3A is a schematic diagram illustrating an example inspection system comprising an example leveling sensor, consistent with embodiments of the present disclosure.

Reference is now made to FIG. 3A illustrating an inspection system 300 comprising an example leveling sensor, consistent with embodiments of the present disclosure. As shown in FIG. 3A, inspection system 300 includes an electron beam tool 310, a stage 320 on which a sample to be inspected (e.g., a wafer 321) is disposed, and a leveling sensor 330. Electron beam tool 310 may emit a primary electron beam 312 onto a region of interest (ROI) on wafer 321 and collect secondary electrons emanated from the wafer 321 to form an image of ROI on wafer 321. Inspection system 300 may be a part of EBI system 100 of FIG. 1 or electron beam tool 310 may be an electron beam tool 40 of FIG. 2. It is to be appreciated that, in the context of this disclosure, a charged-particle and an electron may be interchangeably used. Similarly, elements of the claimed apparatus or methods describing the charged-particle beam(s) may be interchangeably used with an electron beam(s), as appropriate.

In practice, wafer 321 may be observed at a high magnification in inspection system 300 while stage 320 stably supports wafer 321 and moves smoothly along, e.g., horizontal X-Y axes, vertical Z-axis, stage tilt, or stage rotation. While the movements in X and Y axis may be used for selection of a field of view (FOV), the movement in Z-axis may be required for change of image resolution, depth of focus, etc. In some embodiments, vertical displacement of stage 320 may be routinely determined for equipment calibration, based on height measurement or height sensing of standard specimens. For example, a wafer comprising standard patterned features, such as metal lines, photoresist layers, reflective films deposited on wafer, etc. may be used to calibrate equipment, sensors, motors, or stage. Wafer 321's surface is usually nonuniform since wafer 321 comprises patterned features and therefore a height of wafer 321 can be adjusted for image resolution while inspecting the wafer 321.

In some embodiments, leveling sensor 330 may be used for determining a vertical displacement of wafer 321. A vertical displacement of wafer 321, as referred to herein, may correspond to the difference between a target location and an actual location of wafer 321 in the Z-axis. Leveling sensor 330 may communicate with a height controller 340 (described later in detail) such that an output of leveling sensor 330 is analyzed and used to further adjust the wafer height. One or more optical height sensors, such as, leveling sensor 330 may be employed based on the complexity and the accuracy of height sensing desired.

According to embodiments of the present disclosure, leveling sensor 330 can comprise a light source 331 that projects a primary light beam 332 through a selective light passing object 333 onto wafer 321, and a detector 336 that captures an image of a secondary light beam 335 from wafer 321. A projection pattern formed by primary light beam 332 passing through selective light passing object 333 is projected onto wafer 321. Secondary light beam 335 may include a light beam scattered from a surface of wafer 321, a light beam diffracted from a surface of wafer 321, or a combination of a light beam scattered from a surface of wafer 321 and a light beam diffracted from a surface of wafer 321. The image of secondary light beam 335 can correspond to a projection pattern on wafer 321.

In some embodiments, leveling sensor 330 may further comprise a first optical system 334 between light source 331 and wafer 321 and a second optical system 337 between wafer 321 and detector 336. First optical system 334 can include one or more optical lenses that are configured to focus primary light beam 332 onto wafer 321. Second optical system 337 can include one or more optical lenses that are configured to focus secondary light beam 335 onto detector 336. Detector 360 may be a Charge-Coupled Device (CCD) camera or a Complementary Metal-Oxide-Semiconductor (CMOS) sensor that detects secondary light beam 335 to form an image of secondary light beam 335.

In some embodiments, leveling sensor 330 can be used to determine a height displacement of wafer 321 at a position on which primary electron beam 312 is focused such that a high resolution inspection image on a region of interest (e.g., a probe spot of primary electron beam 312) can be obtained.

Figure 3B:
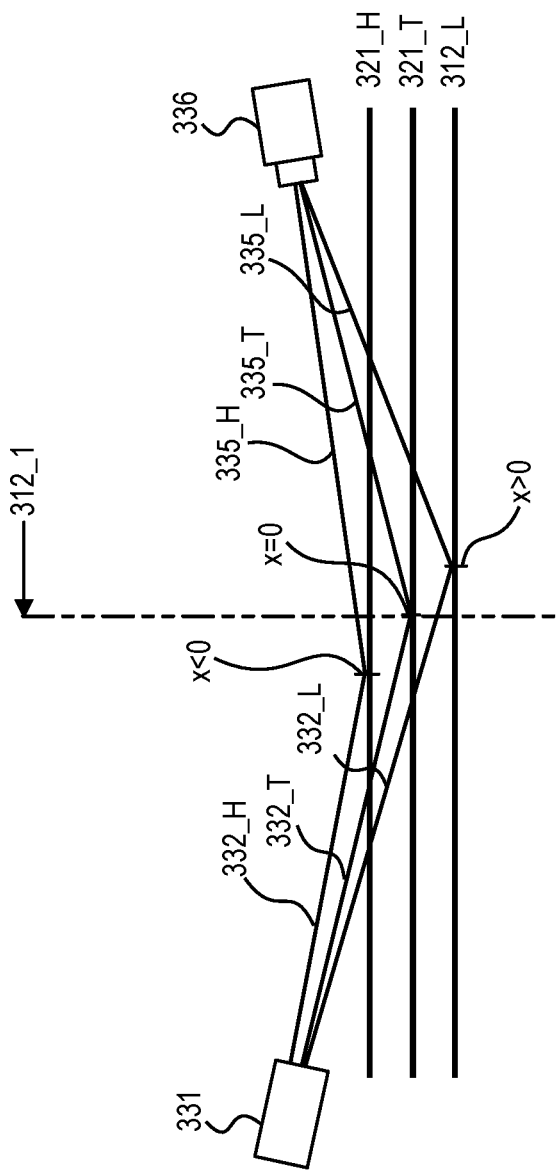
FIG. 3B is a schematic diagram illustrating an operation of a leveling sensor according to a wafer height, consistent with embodiments of the present disclosure.

Reference is now made to FIG. 3B, illustrating an operation of leveling sensor 330 according to a wafer height. In FIG. 3B, an optical axis of primary electron beam 312 is indicated as a vertical dotted line with a reference number 312_1 and a probe spot (e.g., 102_1S, 102_2S, or 102_3S) of primary electron beam 312 is indicated as being located at x=0 in an X-axis. As shown in FIG. 3B, when wafer 321 is positioned at target height 321_T in the Z-axis, a center of a projection pattern projected on wafer 321 matches a probe spot (i.e., x=0) of primary electron beam 312 on wafer 321. When wafer 321 is positioned at a higher position 321_H than target height 321_T, a center of a projected pattern does not match a target probe spot (i.e., the target probe spot being at x=0) of primary electron beam 312. Instead the center of the projected pattern may be positioned at a position x<0. According to embodiments of the present disclosure, based on an image obtained by detector 336, it can be determined that a height of wafer 321 needs to be lowered so that a center of a projected pattern moves to the right side, i.e., to x=0, to match with a focus of a targeted primary beam 312. When wafer 321 is positioned at a lower position 321_L than target height 321_T, a center of a projected pattern does not match a target probe spot (i.e., the target probe spot being at x=0) of primary electron beam 312. Instead the center of the projected pattern may be positioned at a position x>0. According to embodiments of the present disclosure, based on an image obtained by detector 336, it can be determined that a height of wafer 321 needs to be elevated so that a center of a projected pattern moves to the left side, i.e., to x=0, to match with a focus of a targeted primary beam 312.

Referring back to FIG. 3A, leveling sensor 330 may communicate with height controller 340 such that an output of leveling sensor 330 is analyzed and used to further adjust the wafer height. It is appreciated that height controller 340 may be part of or may be separate from a charged-particle beam inspection system (e.g., electron beam inspection system 100 of FIG. 1 or inspection system 300 of FIG. 3A). In some embodiments, height controller 340 may be part of controller 50 and may include an image acquirer, measurement circuitry, or storage, or the like. In some embodiments, height controller 340 may comprise an image processing system and may include an image acquirer, storage, or the like. It is also appreciated that in various embodiments height controller 340 may be part of or may be separate from leveling sensor 330.

As shown in FIG. 3A, height controller 340 may comprise a signal processor 341 and an analyzer 342 according to embodiments of the present disclosure. Signal processor 341 may comprise one or more processors. For example, signal processor 341 may comprise a computer, server, mainframe host, terminals, personal computer, any kind of mobile computing devices, and the like, or a combination thereof. Signal processor 341 may be communicatively coupled to detector 336 through a medium such as an electrical conductor, optical fiber cable, portable storage media, IR, Bluetooth, internet, wireless network, wireless radio, among others, or a combination thereof. Signal processor 341 may be configured to receive a signal from detector 336 and to construct a light intensity image based on the signal from detector 336. Signal processor 341 will be further explained referring to FIG. 4, which illustrates an example of an optical pattern in leveling sensor 320 and a corresponding measured image generated by signal processor 341.

Figure 4:
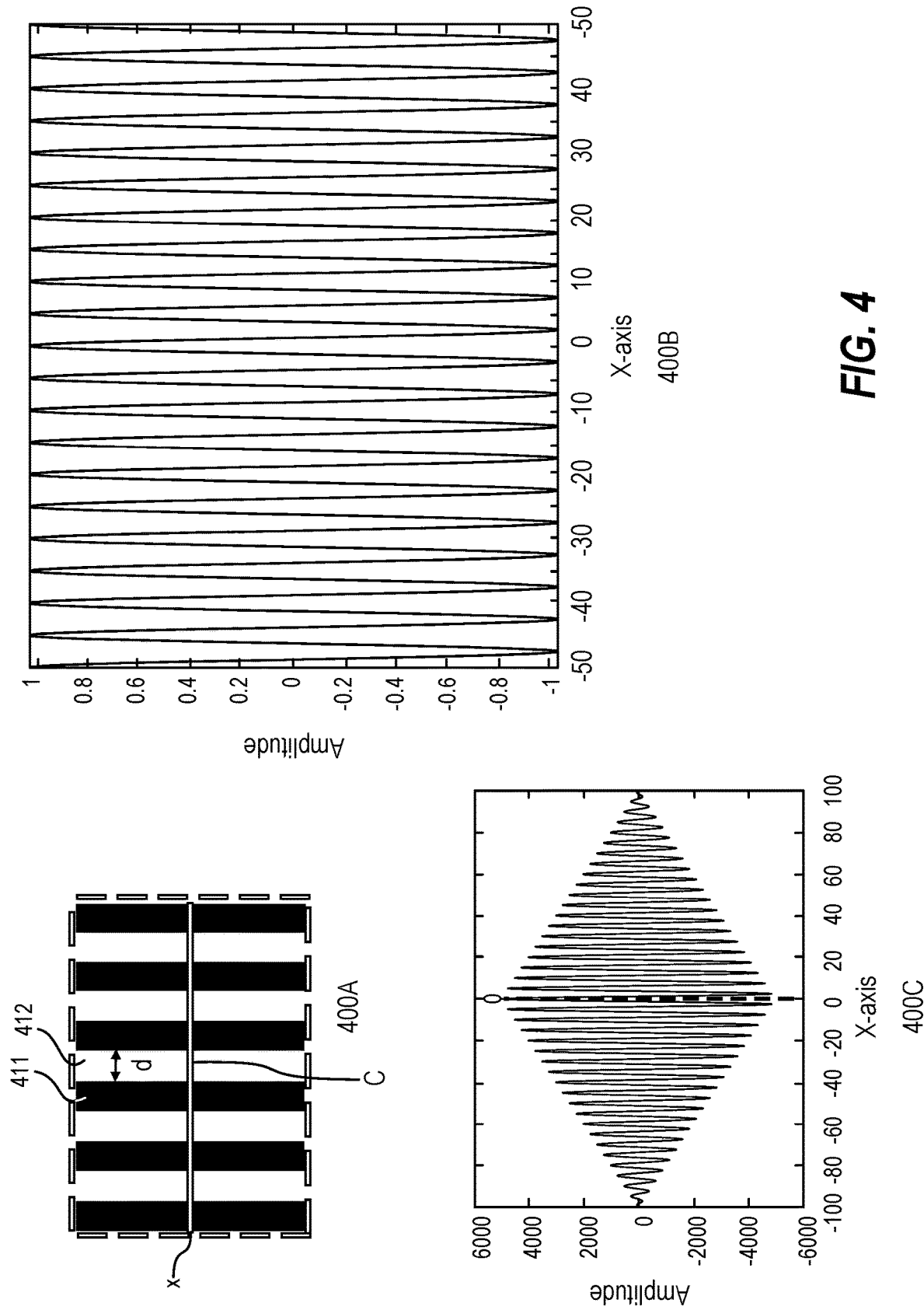
FIG. 4 is an example of an optical pattern in a leveling sensor, a corresponding measured image, and a correlation graph between the measured image and a reference image.

When selective light passing object 333 has a projection pattern 400A as shown in FIG. 4, a light intensity pattern 400B of a projected pattern of projection pattern 400A on wafer 321 can be generated by signal processor 341. It is to be appreciated that pattern 400A shown in FIG. 4 can be a part of an entire pattern of selective light passing object 333. Selective light passing object 333 may include a plurality of light blocking bars 411 (as shown in FIG. 4) arranged in parallel in an X-axis that aligns with an X-axis of wafer 321 when projected onto wafer 321. A primary light beam 322 can pass through slits 412 formed by adjacent two light blocking bars 411 among the plurality of light blocking bars 411. In this example, pattern 400A of selective light passing object 333 has a regularly spaced stripe pattern in an X-axis and thus light intensity pattern 400B measured from a projected pattern of projection pattern 400A on wafer 321 can have a regularity and can be periodic in an X-axis.

Due to physical or optical constraints of inspection system 300, a projected pattern on wafer 321 can be distorted. For example, primary light beam 332 may be projected onto wafer 321 through a small gap (e.g., a height "g" in FIG. 3A) between electron beam tool 310 and wafer 321. Thus, an incident angle (e.g., "Θ" in FIG. 3A) of primary light beam 332 may be limited and primary light beam 332's light cone angle may be also limited. Thereby a projected pattern on wafer 321 by primary light beam 332 can be blurred, e.g., resulting in edges of pulses being smoothed. Thereby, light intensity pattern 400B measured from a projected pattern on wafer 321 can be approximately represented as a periodic cosine function, instead of having a square like shape, as below:

$$f(x) = \cos(kx) \quad \text{(Equation 1)}$$

Here, $k=2\pi/\lambda$ and $\lambda$ is a period of projection pattern 400A, which can be determined as a length (e.g., in an X-axis) corresponding to a unit cycle of a repeating pattern. For example, in light intensity pattern 400B, one cycle of a pattern corresponds to a length 5 in an X-axis and thus $\lambda$ can be set as a constant 5.

Referring back to FIG. 3A, analyzer 342 may be configured to determine whether wafer 321 is positioned in a target height or whether wafer 321 is displaced from the target height. Analyzer 342 may be further configured to determine a degree of a vertical displacement of wafer 321. In some embodiments, analyzer 342 is configured to cross-correlate measured data of a projected pattern on wafer 321 with reference data. In some embodiments, analyzer 342 can be configured to cross-correlate a light intensity image of a projected pattern on wafer 321 with a predetermined reference light intensity image. According to embodiments of the present disclosure, a reference light intensity image can be a light intensity image obtained by using a projection pattern equal to the projection pattern currently being used for inspecting target wafer 321. In some embodiments, a reference light intensity image can be obtained by projecting a projection pattern onto a nominal reference wafer and then by measuring a projected pattern of the projection pattern on the nominal reference wafer. Here, a reference wafer can have a flat surface and be placed at a target location (e.g., at a target height) when taking the reference light intensity image. In some embodiments, a reference light intensity image can be taken before inspecting target wafer 321 and stored in a storage (not shown) that can be located within or outside of inspection system 300. Analyzer 342 can have access to a reference light intensity image stored in a storage or can receive a reference light intensity image from a storage on demand.

Based on Equation 1 representing light intensity pattern 400B, a cross-correlation function between a light intensity image of a projected pattern on wafer 321 and a predetermined reference light intensity image can be represented as below:

$$(f * f)(\tau) \triangleq \int_{-\alpha}^{\alpha} f(x) f(x+\tau) dx = \frac{1}{2} \int_{-\alpha}^{\alpha} \cos(2kx+k\tau) dx + \alpha \cos(k\tau) \quad \text{(Equation 2)}$$

Here, $\tau$ represents a pattern shift of light intensity pattern 400B in an X-axis and a range from $-\alpha$ to $\alpha$ represents an integral interval. It is noted that the light intensity image of a projected pattern on wafer 321 and a predetermined reference light intensity image have the same function $f(x)$ in Equation 2 and thus it is understood that Equation 2 represents self-cross correlation. Because k is a constant value, an Equation 2 can be expressed as Equation 3 below:

$$(f \star f)(\tau) = \left[\frac{\sin(2k\alpha)}{2k} + \alpha\right] \cos(k\tau) \quad \text{(Equation 3)}$$

As shown in Equation 3, an amplitude value $$\left[\frac{\sin(2k\alpha)}{2k} + \alpha\right]$$

of peaks does not change when patterns are periodical and boundless in an X-axis. Therefore, it is difficult to find a pattern shift when projected on wafer 321 from a theoretical cross-correlation. For example, if a projection pattern shifts in an X-axis by one cycle (e.g., λ), it is difficult to determine whether the projection pattern is shifted or not because of the periodicity.

In practice, selective light passing object 333 has a limited area and thus a projection pattern is bounded within a certain range in an X-axis. In some embodiments, selective light passing object 333 may have a size enabling a projected pattern on wafer 321 to cover a region of interest (e.g., a probe spot of primary electron beam 312) so that a wafer height can be properly adjusted in the region of interest. For example, an area of the projected pattern on wafer 321 can be equal to or greater than the region of interest. Referring back to FIG. 4, a cross-correlation graph 400C of FIG. 4 represents result data of cross-correlation of light intensity image 400B with a reference light intensity image. Here, a reference light intensity image can be obtained by projecting projection pattern 400A on a nominal reference wafer, which is placed at a target height, and by measuring light intensities of a projected pattern on the wafer. In this example, it is also assumed that light intensity image 400B is also taken when wafer 321 is placed at a target height (e.g., 321_T in FIG. 3B) and thus patterns of light intensity image 400B and a reference light intensity image can match along an X-axis. As shown in FIG. 4, peak values gradually increase in cross-correlation graph 400C from x=−100 to x=0, and then gradually decrease from x=0 to x=100 because of a bounded projection pattern in an X-axis. Based on cross-correlation graph 400C of FIG. 4, it can be determined that patterns of light intensity image 400B and a reference intensity image matches the best at a position x=0 and mismatch otherwise, which may lead up to a conclusion that the projection pattern 400A has not shifted and the projection pattern 400A's center lies at a focus (i.e., x=0) of primary electron beam 312.

In this case, height adjustment of wafer 321 is not required. Therefore, a cross-correlation graph between a light intensity image and a reference light intensity image when using a bounded projection pattern can provide a better accuracy in determining a shift of the projection pattern.

However, even small noise introduction can cause peak values of a cross-correlation graph (e.g., 400C in FIG. 4) to be disturbed because a difference between adjacent peaks are not substantially different in the cross-correlation graph. In particular, a difference between the biggest peak value and an adjacent peak value may not be distinguishable with noise. For example, detector (e.g., detector 366 in FIG. 3A) noise, light intensity fluctuation, etc. can make it difficult to locate a center C of a projection pattern on wafer 321 based on a cross-correlation. In addition, fabrication processes of wafer 321 can cause non-uniform reflection coefficients over a surface of wafer 321. With small noise or distortion, a peak value at a center C of a projection pattern may be smaller than a peak value elsewhere, which leads to an incorrect detection of a vertical displacement.

To enhance a resistance to noise or distortion in detecting a shift of a projection pattern, embodiments of the present disclosure can provide leveling sensor 320 using a projection pattern that can provide a distinctive peak value in a cross-correlation graph at a center C of the projected pattern on wafer 321. In some embodiments, a projection pattern can have a phase out pattern that is not periodic along a certain direction (e.g., X-axis). By using a projection pattern of which the period varies along a certain direction, a measured image of a projected pattern on wafer 321 and a reference image cannot match well except at center C of a projection pattern on wafer 321. When using a phase out pattern, a light intensity image measured from a projected pattern on wafer 321 can be approximately represented as below:

$$f(x) = \cos(g(x) \cdot x) \quad \text{(Equation 4)}$$

In Equation 4, a period of a cosine function f(x) varies depending a function g(x).

According to embodiments of the present disclosure, selective light passing object 333 can have various projection patterns that can fit an Equation 4. Examples of a phase out projection pattern will be explained referring to FIG. 5A to FIG. 5E, each being an example of an optical pattern in leveling sensor 320, a corresponding measured image, and a correlation graph, consistent with embodiments of the present disclosure. In FIG. 5A to FIG. 5E, projection patterns 501A to 501E have a plurality of light blocking bars 511 and a gap (i.e., a width of slit 512) between two adjacent light blocking bars 511 is not uniform over an X-axis.

Figure 5A:
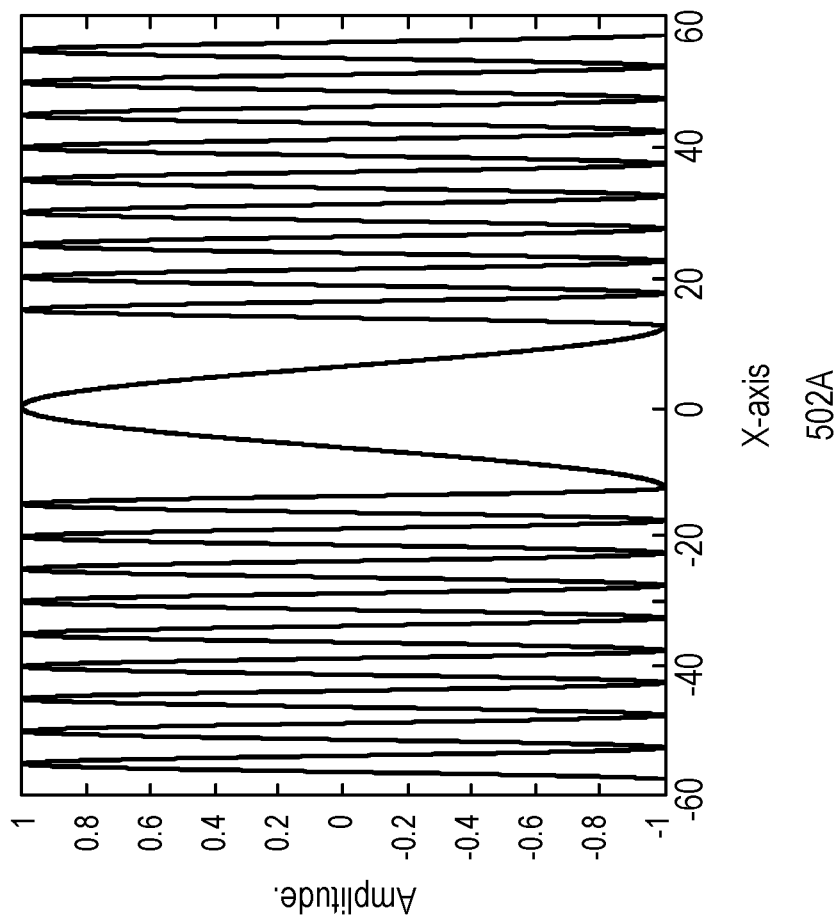
FIG. 5A to FIG. 5E each is an example of an optical pattern in a leveling sensor, a corresponding measured image, and a correlation graph between the measure image and a reference image, consistent with embodiments of the present disclosure.
Figure 5A:
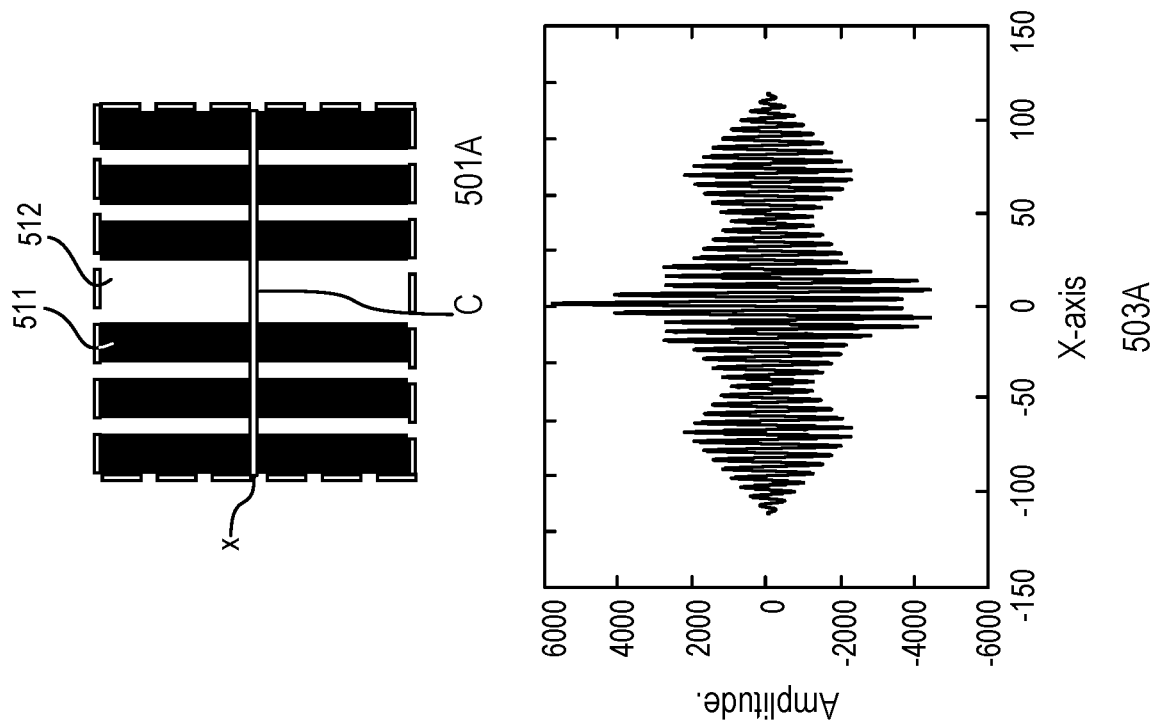

FIG. 5A illustrates a projection pattern 501A of which a plurality of light blocking bars 511 are arranged such that a gap between adjacent light blocking bars 511 in an X-axis is represented as below:

$$g(x) = \begin{cases} k1, & |x| \le a \\ k2, & |x| > a \end{cases} \quad \text{(Equation 5)}$$

Here, k1 and k2 are constants and "a" is a value on an X-axis where a period of the pattern changes. In some embodiments, parameters k1, k2, and "a" can be determined according to designs of leveling sensor 320, requirements of embodiments, etc. In FIG. 5A, a distance between two adjacent light blocking bars 511 at a center area is greater than a distance between two adjacent light blocking bars 511 elsewhere. In this example, k1 is greater than k2 and "a" can have a value on an X-axis where a light blocking bar closest to the center area is positioned. A light intensity image 502A in FIG. 5A shows that the measured patterns also have an irregular period along an X-axis, i.e., a large period in a center area and a smaller period elsewhere. As shown in a cross-correlation graph 503A of FIG. 5A between light intensity image 502A and a reference light intensity image, peak values of cross-correlation graph 503A substantially change along an X-axis. That is, a peak value at x=0 (here, where a center C of a projected pattern corresponding to projection pattern 501A) is much larger than other peak values at x≠0 because light intensity image 502A of a projected pattern onto wafer 321 and a reference image cannot match well except a center C of the projected pattern due to irregular periods of projection pattern 501A.

Figure 5B:
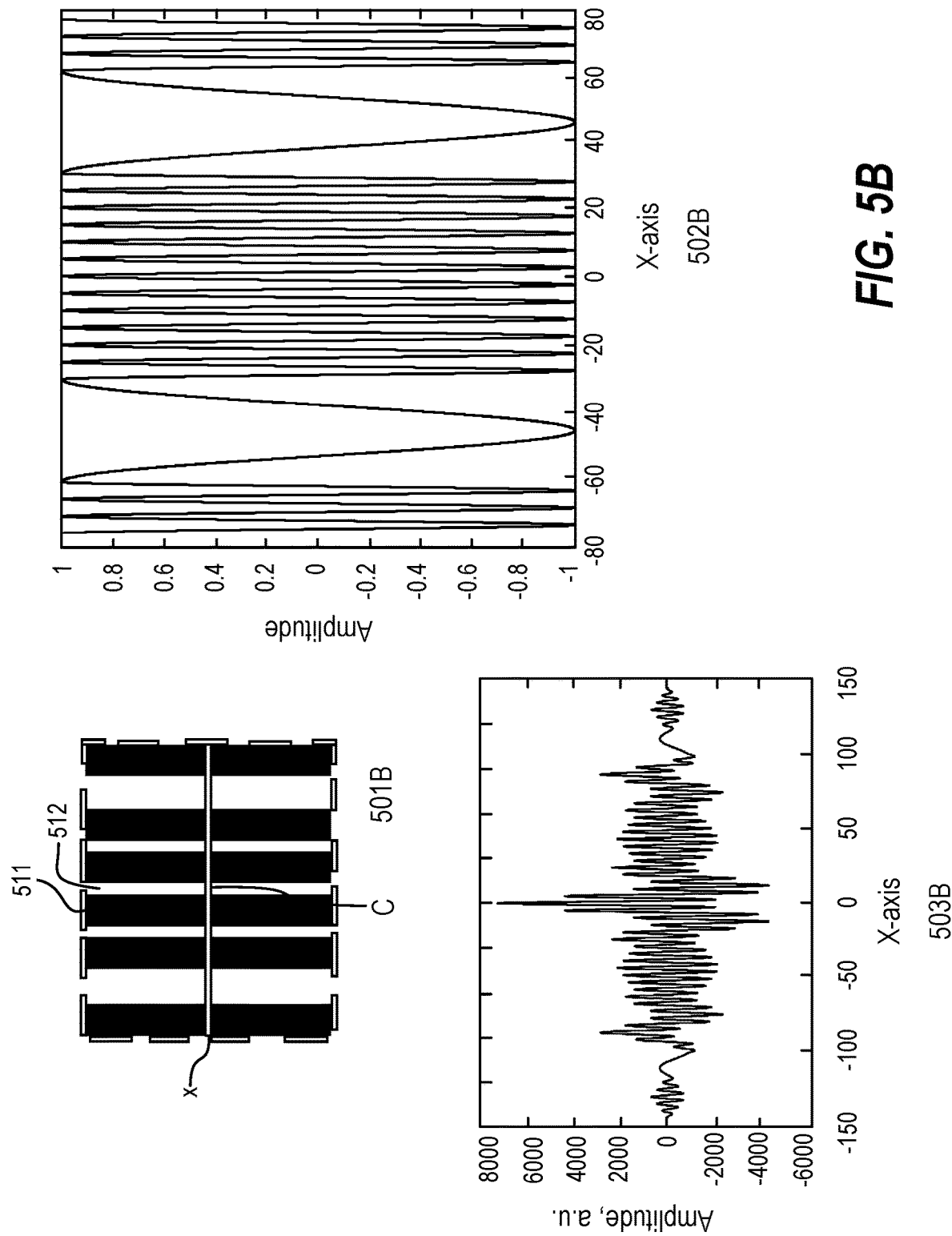

FIG. 5B illustrates a projection pattern 501B of which a plurality of light blocking bars 511 are arranged such that a gap between adjacent light blocking bars 511 in an X-axis is represented below:

$$g(x) = \begin{cases} k1, & a \le |x| \le b \\ k2, & |x| > b \text{ or } |x| < a \end{cases} \quad \text{(Equation 6)}$$

Here, k1 and k2 are constants, "a" and "b" are values on an X-axis where a period of the pattern changes, and a>b. In some embodiments, parameters k1, k2, "a," and "b" can be determined according to designs of leveling sensor 320, requirements of embodiments, etc. In FIG. 5B, a distance between two adjacent light blocking bars 511 between "a" and "b" is different from a distance between two adjacent light blocking bars 511 elsewhere. In this example, k2 is greater than k1. A light intensity image 502B in FIG. 5B shows that the measured patterns also have an irregular period along an X-axis, i.e., a smaller period at α≤|x|≤b and a larger period elsewhere. As shown in a cross-correlation graph 503B of FIG. 5B between light intensity image 502B and a reference light intensity image, peak values of correlation graph 503B change along an X-axis. Here, a peak value at x=0 (here, where a center C of a projected pattern corresponding to projection pattern 501B) is much larger than other peak values at x≠0 because light intensity image 502B of a projected pattern on wafer 321 and a reference light intensity image cannot match well except a center C of the projected pattern due to irregular periods of projection pattern 501B.

Figure 5C:
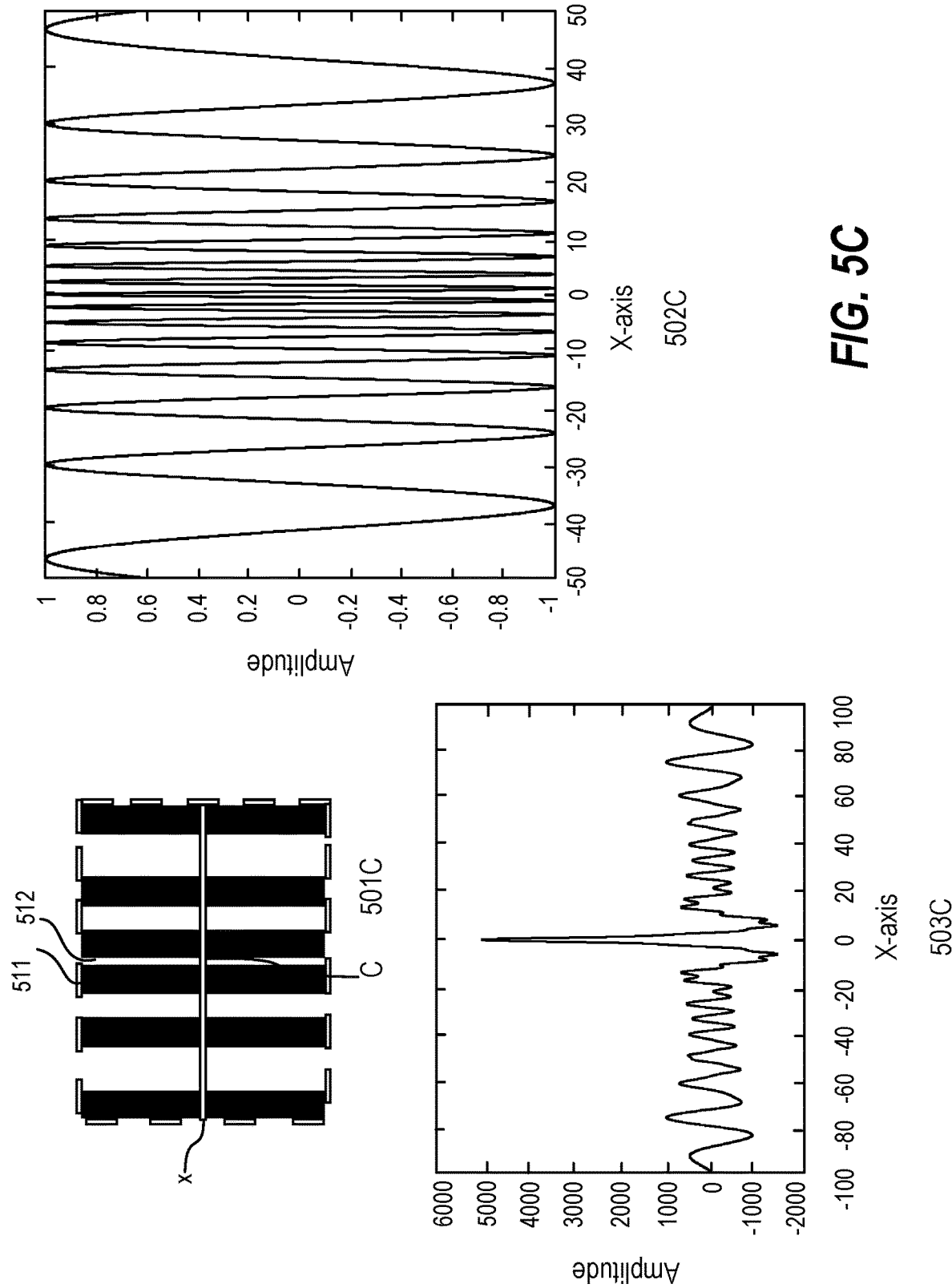

Similarly, FIG. 5C illustrates a projection pattern 501C of which a plurality of light blocking bars 511 are arranged such that a gap between adjacent light blocking bars 511 in an X-axis is represented as below:

$$g(x) = \frac{2\pi}{C_1|x| + C_0} \quad \text{(Equation 7)}$$

Here, $C_1$ and $C_0$ are constants. In some embodiments, parameters $C_1$ and $C_0$ can be determined according to designs of leveling sensor 320, requirements of embodiments, etc. In FIG. 5C, a distance between two adjacent light blocking bars 511 increases as a distance from a center C of projection pattern 501C increases. That is, a distance between two adjacent light blocking bars is inversely proportion to a distance from a center of projection pattern 501C. A light intensity image 502C in FIG. 5C shows that the measured patterns also have an irregular period along an X-axis, i.e., the period increases as a distance from the center C increases. As shown in a cross-correlation graph 503C of FIG. 5C between light intensity image 502C and a reference light intensity image, peak values of correlation graph 503C change along an X-axis. Here, a peak value at x=0 (here, where a center C of a projected pattern corresponding to projection pattern 501C) is much larger than other peak values at x≠0 because light intensity image 502C of a projected pattern on wafer 321 and a reference light intensity image cannot match well except a center C of the projected pattern due to irregular periods of projection pattern 501C.

Figure 5D:
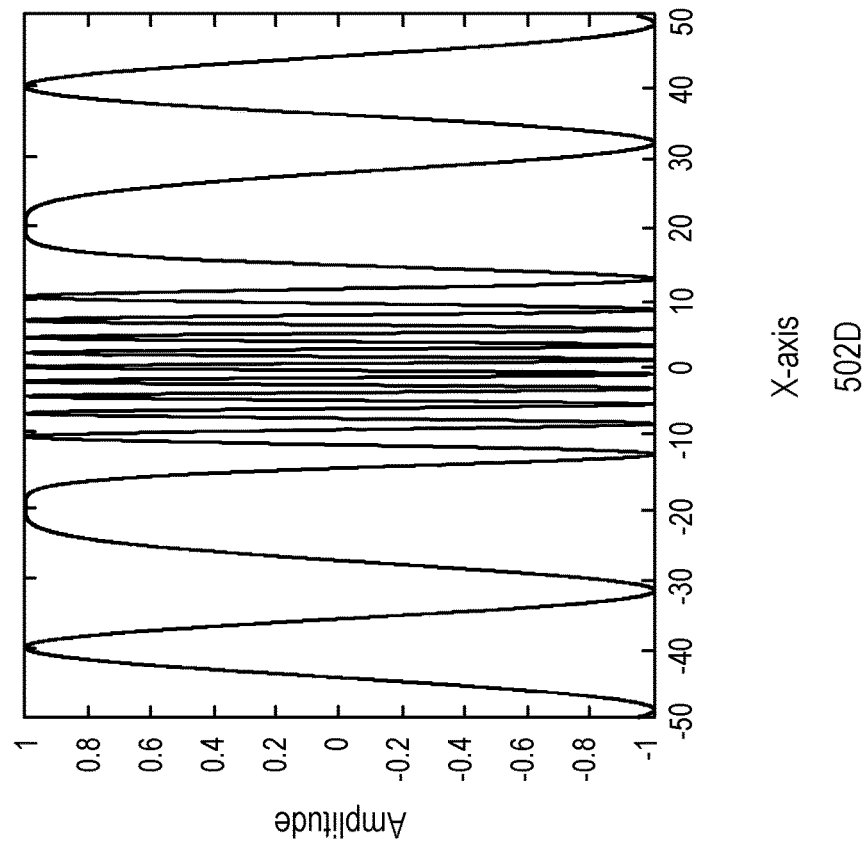
Figure 5D:
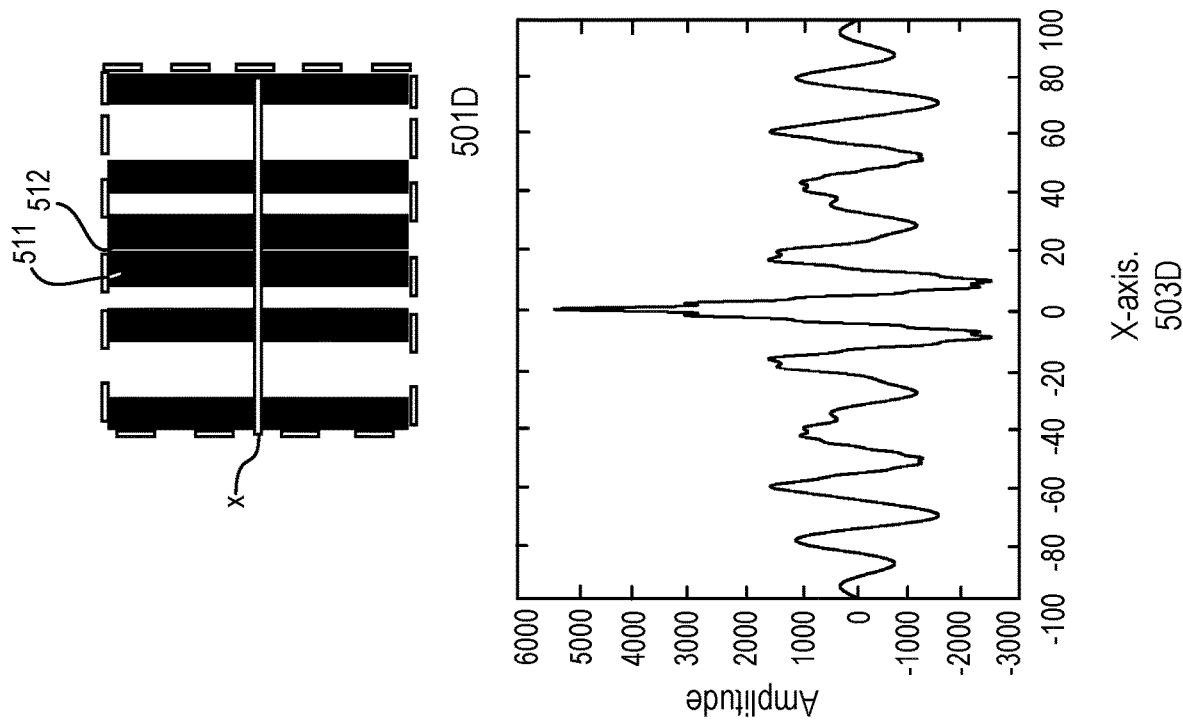

FIG. 5D illustrates a projection pattern 501D of which a plurality of light blocking bars 511 are arranged such that a gap between adjacent light blocking bars 511 in an X-axis is represented as below:

$$g(x) = \frac{2\pi}{C_2|x|^2 + C_1|x| + C_0} \quad \text{(Equation 8)}$$

Here, $C_2$, $C_1$, and $C_0$ are constants. In some embodiments, parameters $C_2$, $C_1$, and $C_0$ can be determined according to designs of leveling sensor 320, requirements of embodiments, etc. In FIG. 5D, a distance between two adjacent light blocking bars increases as a distance from a center C of projection pattern 501D increases. Here, a distance between two adjacent light blocking bars is inversely proportion to a square of a distance from a center C of projection pattern 501D. A light intensity image 502D in FIG. 5D shows that the measured patterns also have an irregular period along an X-axis, i.e., the period increases as a distance from the center C increases. As shown in a correlation graph 503D of FIG. 5D between light intensity image 502D and a reference light intensity image, peak values of correlation graph 503D change along an X-axis. Here, a peak value at x=0 (here, where a center C of a projected pattern corresponding to projection pattern 501D) is much larger than other peak values at x≠0 because light intensity image 502D of a projected pattern on wafer 321 and a reference light intensity image cannot match well except a center C of the projected pattern due to irregular periods of projection pattern 501D.

Figure 5E:
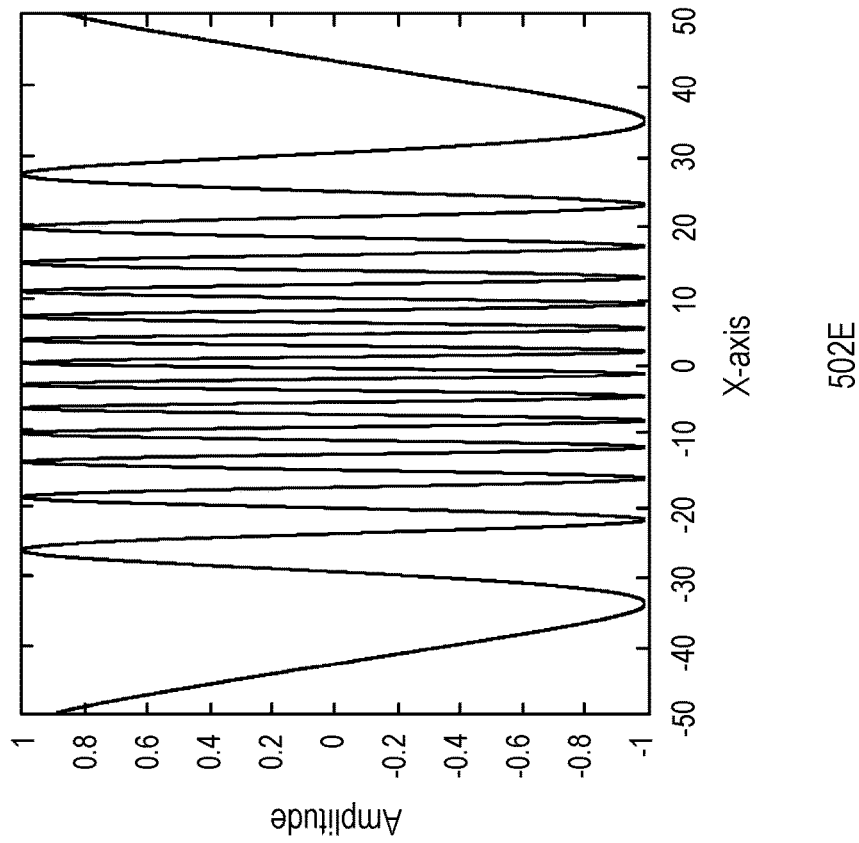
Figure 5E:
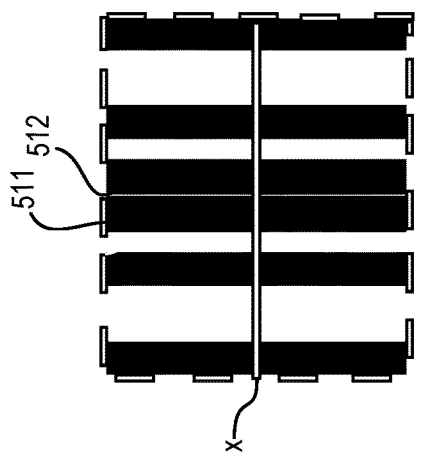
Figure 5E:
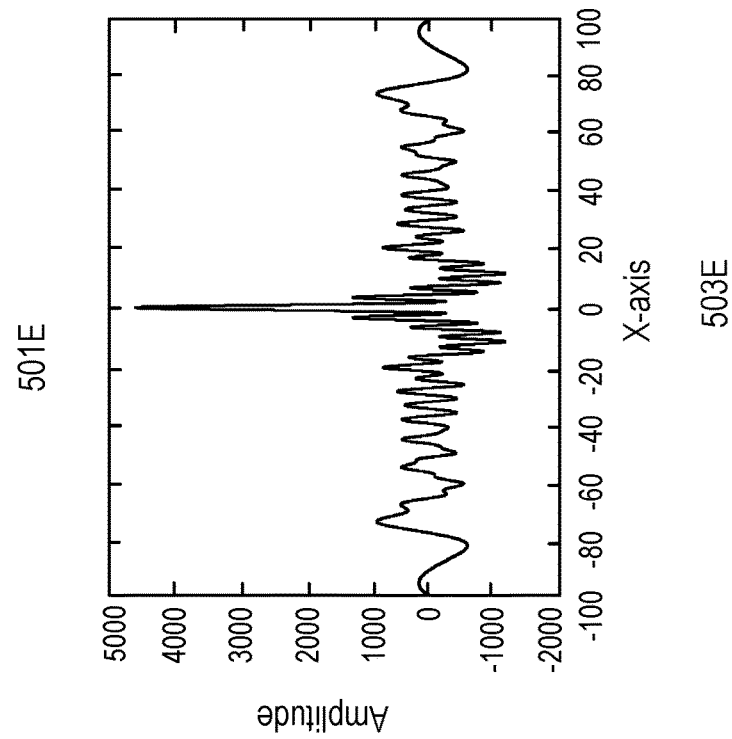

Similarly, FIG. 5E illustrates a projection pattern 501E of which a plurality of light blocking bars 511 are arranged such that a gap between adjacent light blocking bars 511 in an X-axis is represented as below:

$$g(x) = \frac{2\pi}{de^{-\frac{x^2}{2\sigma^2}}} \quad \text{(Equation 9)}$$

Here, "d" and σ are constants. In some embodiments, parameters "d" and σ can be determined according to designs of leveling sensor 320, requirements of embodiments, etc. In FIG. 5E, a distance between two adjacent light blocking bars 511 increases as a distance from x=0 increases. Here, a distance between two adjacent light blocking bars is inversely proportion to $$e^{-\frac{x^2}{2\sigma^2}}.$$

A light intensity image 502E in FIG. 5E shows that the measured patterns also have an irregular period along an X-axis, i.e., the period increase as a distance from the center C increase. As shown in a correlation graph 503E in FIG. 5E between light intensity image 502E and a reference light intensity image, peak values of correlation graph 503E change along an X-axis. Here, a peak value at x=0 (here, where a center C of a projected pattern corresponding to projection pattern 501E) is much larger than other peak values at x≠0 because light intensity image 502E of a projected pattern on wafer 321 and a reference light intensity image cannot match well except a center C of the projected pattern due to irregular periods of projection pattern 501E.

When using phase out projection patterns 501A to 501E, differences between adjacent peaks in cross-correlation graphs 503A to 503E become larger than a cross-correlation graph (e.g., 400C in FIG. 4) using a regular projection pattern (e.g., 400A in FIG. 4) and thus inspection system 300 can have better tolerance to noise or distortion due to wafer surface variation, detector noise, light intensity fluctuation, etc. In some embodiments, a phase out projection pattern can be designed such that a resulting cross-correlation graph's biggest peak value and a second biggest peak value (or a peak value adjacent to the biggest peak) have a ratio equal to or greater than a threshold ratio. For example, equations (e.g., Equations 5 to 9) or parameters (e.g., k1, k2, "a," "b," $C_2$, $C_1$, $C_0$, "d," or σ) can be set so that a ratio of the biggest peak value to the second biggest peak value (or a peak value adjacent to the biggest peak) is equal to or greater than a threshold ratio. The threshold ratio can be set according to requirements of embodiments, desired level of accuracy, etc. In some embodiments, a phase out projection pattern can be designed to have a target ratio between the biggest peak value and the second biggest peak value based in part on wafer reflectivity measurements, experiment results with various pattern designs, etc.

Referring back to FIG. 3A, analyzer 342 can determine a vertical displacement of wafer 321 based on a cross-correlation result between a measured light intensity image corresponding a phase out projection pattern and a reference light intensity image. When a projected pattern's center does not match with a position x=0 (e.g., a focus of primary electron beam), a cross-correlation graph would have the largest peak value at x≠0. In some embodiments, analyzer 342 can determine a vertical displacement of wafer 321 based on the shift. For example, if the largest peak value of a cross-correlation graph lies at x=5, analyzer 342 can determine that wafer 321 should be lifted to move the center C of a projection pattern to a position x=0. If the largest peak value of a cross-correlation graph lies at x=−5, analyzer 342 can determine that wafer 321 should be lowered to move the center C of a projection pattern to a position x=0. In some embodiments, analyzer 342 can determine a vertical displacement of wafer 321 based on a shift amount of the largest peak value of a cross-correlation graph. In some embodiments, a relationship between a vertical displacement of wafer and a shift amount of the projected pattern can be preestablished based on experiments, measurements, tests, etc.

In some embodiments, height controller 340 can further include a stage motion controller 343 that is configured to adjust a height of wafer 321 according to the determined vertical displacement. Stage motion controller 343 may control stage 320 to move wafer 321 based on the vertical displacement determined by analyzer 342.

Figure 6:
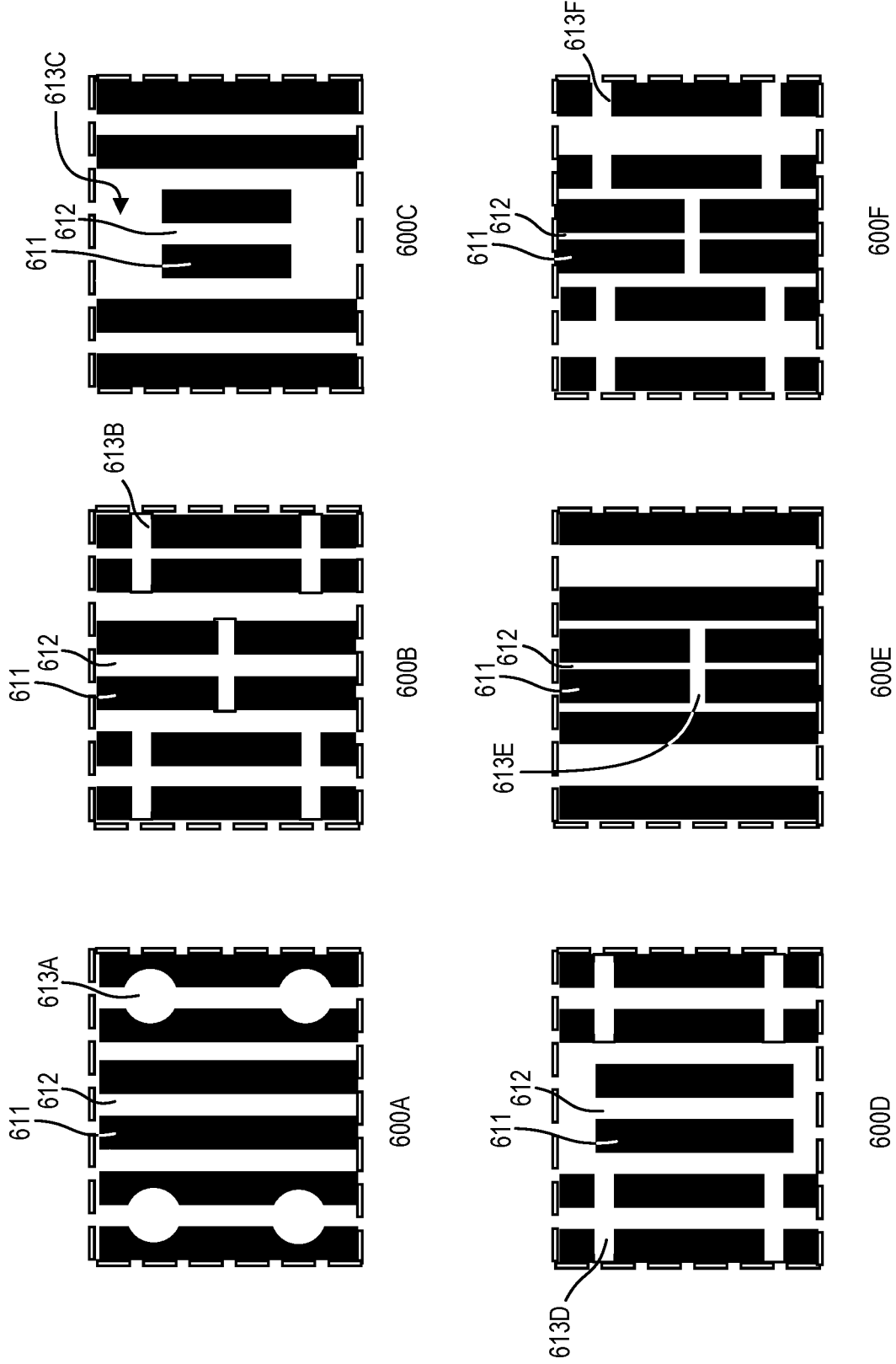
FIG. 6 illustrates examples of an optical pattern comprising a local phase out feature, consistent with embodiments of the present disclosure.
Figure 7:
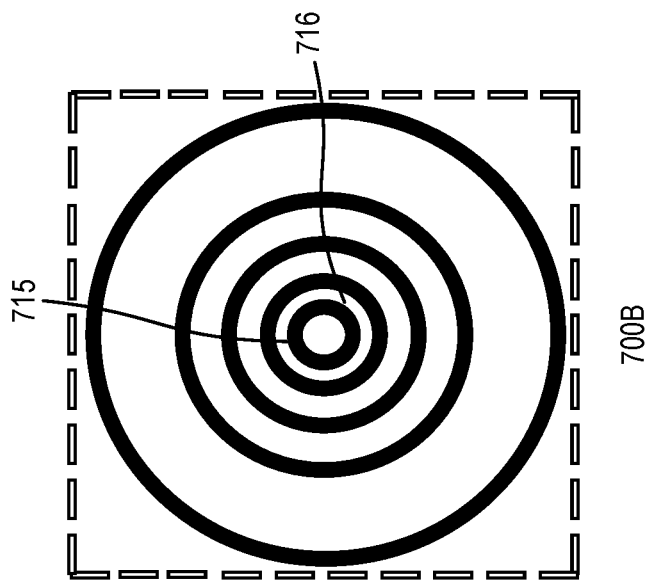
FIG. 7 illustrates examples of an optical pattern comprising a two-dimensional phase out feature, consistent with embodiments of the present disclosure.
Figure 7:
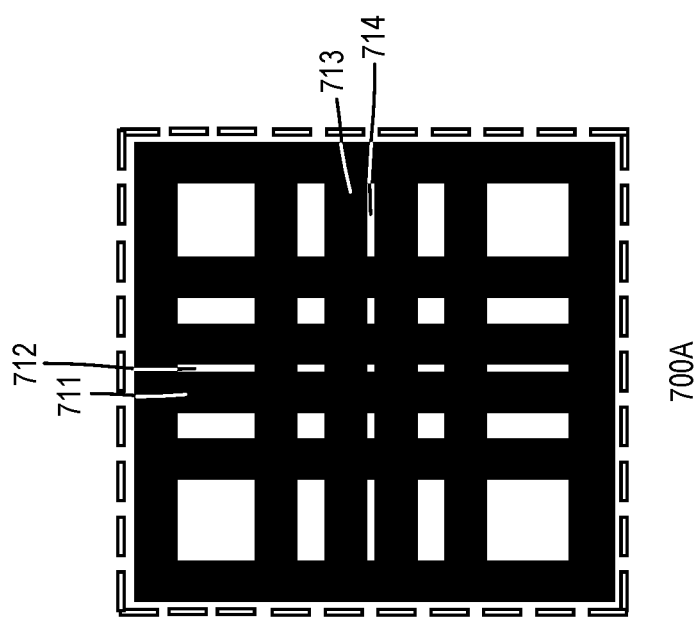

While embodiments of the present disclosure have been explained with respect to a projection pattern having a variable period in one direction (e.g., X-axis) as a phase out projection pattern of selective light passing object 333, it should be noted that the present disclosure is also applicable when other types of phase out projection patterns are used for leveling sensor 320. Referring to FIG. 6 and FIG. 7, other types of phase out projection patterns will be explained.

FIG. 6 illustrates examples of an optical pattern comprising a local phase out feature, consistent with embodiments of the present disclosure. According to some embodiments of the present disclosure, a localized feature can be added to enhance tolerance to noise and to enhance accuracy of detecting a vertical displacement of wafer 321. A localized feature also enables detecting a height displacement of a wafer other than a center of a projected pattern. As shown in projection patterns 600A to 600D, a localized feature 613A, 613B, 613C, or 613D can be added to a projection pattern having a regular period.

According to some embodiments of the present disclosure, a localized feature can have a pattern that breaks a periodicity of projection patterns. For example, in projection pattern 600A, a circular shape opening 613A, which has a different shape of a regular slit 612, is added to projection pattern 600A having regularly spaced slits 612 formed by adjacent two light blocking bars 611. In projection pattern 600B, a slit 613B, which extends in an X-axis while the regularly spaced slits 612 extend in a Y-axis, is added to projection pattern 600B having regularly spaced slits 612 formed by adjacent two light blocking bars 611. In projection pattern 600C, a slit 613C, which extends in an X-axis while the regularly spaced slits 612 extend in a Y-axis and which has a wider width than the regularly spaced slits 612, is added to projection pattern 600C. In projection pattern 600D, a slit 613D, which is similar to a slit 613B, is added to projection pattern 600D.

According to some embodiments of the present disclosure, a localized feature can be added to break a periodicity of a projection pattern. For example, while projection pattern 600A having regularly spaced slits 612 has a constant period along an X-axis, circular shape openings 613A are added at positions in projection pattern 600A to break regularity in an X-axis. That is, circular shape openings 613A are not regularly placed in an X-direction Similarly, slits 613B, 613C, and 613D are added at positions in projection pattern 600B to 600D to break regularity in an X-direction.

In some embodiments, enhancing irregularity of non-periodic projection patterns can help when it is advantageous to simultaneously measure a height at a position other than a beam focus or when part of a projected pattern or measured light intensity image is distorted. In some embodiments, adding a localized feature enables detecting a vertical displacement of wafer 321 at a position other than a beam focus or center of a projection pattern. According to some embodiments of the present disclosure, a localized feature can be added to enhance an irregularity of a non-periodic projection pattern. For example, projection patterns 600E and 600F have a variable period in an X-axis (i.e., an increasing period along an X-axis as a distance from a center increases) and slits 613E and 613F, which extend in an X-axis while the slits 612 extend in Y-axis, are added at positions to break regularity in an X-direction.

FIG. 7 illustrates examples of an optical pattern comprising a two-dimensional phase out feature, consistent with embodiments of the present disclosure. A projection pattern 700A of FIG. 7 has a first variable period in an X-axis by slits 712 formed by light blocking bars 711 and a gap of the slits 712 varies along an X-axis (e.g., increases as a distance from a center of projection pattern 700A increases). Projection pattern 700A of FIG. 7 also has a second variable period in a Y-axis by slits 714 formed by light blocking bars 713 and a gap of the slits 714 varies along a Y-axis (e.g., increases as a distance from a center of projection pattern 700A increases). A projection pattern 700B has a variable period in two dimensions (e.g., X-axis and Y-axis) by slits 716 formed by light blocking rings 715 and a gap of the slits 716 varies radially. By extending irregularity of a projection pattern to two dimensions, accuracy in detecting a vertical displacement of a wafer at a center of a projection pattern can be improved.

While embodiments of the present disclosure have been explained with respect to a projection pattern having a variable period in certain axes (e.g., X-axis and Y-axis), it should be noted that the present disclosure is applicable where a projection pattern has a variable period in any two directions. It is also to be appreciated that a level of irregularity should be considered when designing a phase out projection pattern because, if a period varies too much, sensitivity of detecting a vertical displacement may be degraded due to a limited size of a projection pattern, a limited region of interest, etc. It is also to be appreciated that an inspection system's numerical aperture (e.g., "g" in FIG. 3A) can be also considered when designing a phase out projection pattern because blurriness of a projected pattern can depend on the numerical aperture.

Figure 8:
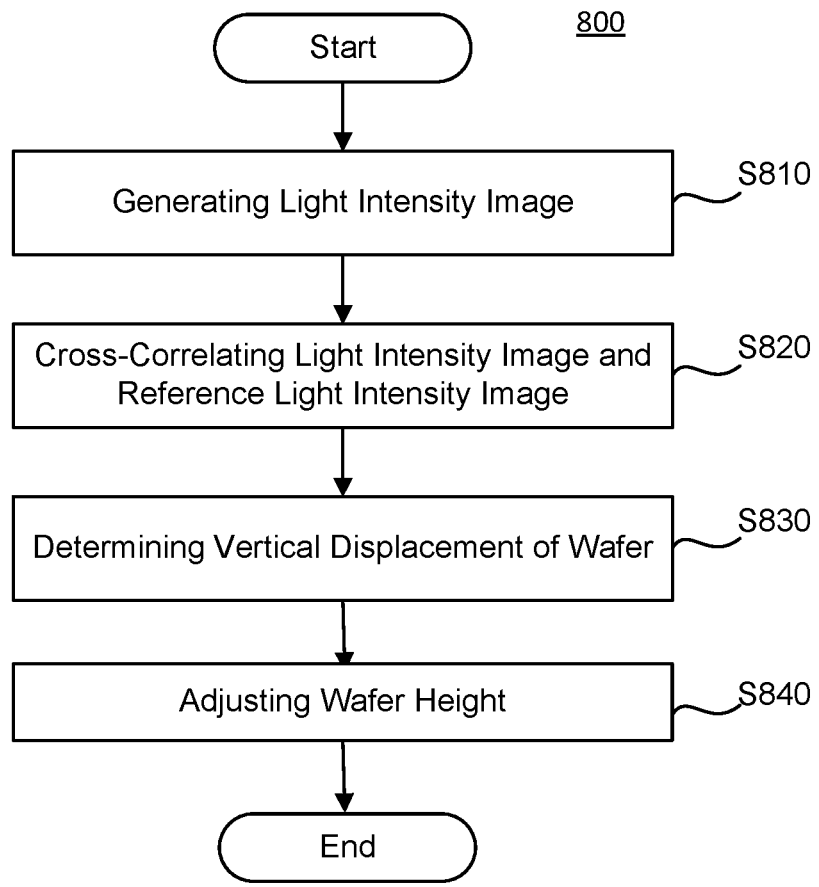
FIG. 8 is a process flowchart representing an example method for adjusting a wafer height, consistent with embodiments of the present disclosure.

FIG. 8 is a process flowchart representing an example method for adjusting a wafer height, consistent with embodiments of the present disclosure. For illustrative purpose, a method for adjusting a wafer height will be described referring to FIG. 3A.

In step S810, a light intensity image can be generated. Step S810 can be performed by, for example, signal processor 341, among others. According to embodiments of the present disclosure, a signal from detector 336 can be obtained to measure a projected pattern on wafer 321. In some embodiments, a light intensity image of the projected pattern on wafer 321 can be generated. In some embodiments, the projected pattern from wafer 321 can correspond to a projection pattern of selective light passing object 333. According to embodiments of the present disclosure, a projection pattern of selective light passing object 333 can have an irregularity. In some embodiments, a projection pattern can have a variable period in one dimension (e.g., as illustrated referring to FIG. 5A to FIG. 5E). In some embodiments, a projection pattern can have a localized phase out feature (e.g., as illustrated referring to FIG. 6). In some embodiments, a projection pattern can have a variable period in two dimensions (e.g., as illustrated referring to FIG. 7).

In step S820, a cross-correlation between the light intensity image and a reference light intensity image is performed. Step S820 can be performed by, for example, analyzer 342, among others. According to embodiments of the present disclosure, cross-correlation of a light intensity image of a projected pattern on wafer 321 with a predetermined reference light intensity image can be performed. According to embodiments of the present disclosure, a reference light intensity image can be a light intensity image measured from a projected pattern based on selective light passing object 331 having a projection pattern equal to a projection pattern currently being used for inspecting target wafer 321. In some embodiments, a reference light intensity image can be obtained by projecting a projection pattern onto a nominal reference wafer. Here, a reference wafer can have a flat surface and be placed at a target location (e.g., target height) when taking the reference light intensity image. In some embodiments, a reference light intensity image can be taken before inspecting target wafer 321 and stored in a storage (not shown) that can be located within or outside of inspection system 300. A reference light intensity image stored in a storage can be accessed or received from a storage on demand.

In step S830, a vertical displacement of stage is determined. Step S830 can be performed by, for example, analyzer 342, among others. According to embodiments of the present disclosure, a vertical displacement of wafer 321 can be determined based on a cross-correlation result between a measured light intensity image corresponding a phase out projection pattern and a reference light intensity image. When a projected pattern's center does not match with a position x=0 (e.g., a focus of primary electron beam), a cross-correlation graph would have the largest peak value at x≠0. In some embodiments, a vertical displacement of wafer 321 can be determined based on the shift. For example, if the largest peak value of a cross-correlation graph lies at x=5, it can be determined that wafer 321 should be lifted to move the center C of a projection pattern to a position x=0. If the largest peak value of a cross-correlation graph lies at x=−5, it can be determined that wafer 321 should be lowered to move the center C of a projection pattern to a position x=0. In some embodiments, a vertical displacement of wafer 321 can be determined based on a shift amount of the largest peak value of a cross-correlation graph. In some embodiments, a relationship between a vertical displacement of wafer and a shift amount of a shift amount of the projection pattern can be preestablished based on experiments, measurements, tests, etc.

In step S840, a wafer height is adjusted. Step S840 can be performed by, for example, stage motion controller 343, among others. According to embodiments of the present disclosure, a height of wafer 321 can be adjusted according to the determined vertical displacement. In some embodiments, stage 320 can be controlled to move wafer 321 based on the vertical displacement determined at step S830.

Aspects of the present disclosure are set out in the following numbered clauses:

1. A charged-particle beam inspection system comprising:
   a stage configured to hold a sample; and
   a leveling sensor configured to determine a vertical displacement of the sample and comprising:
      a light source configured to project a first pattern onto the sample; and
      a detector configured to capture an image of a projected pattern after the first pattern is projected on the sample,
   wherein the first pattern comprises an irregularity to enable a determination of the vertical displacement of the sample.

2. The system of clause 1, wherein the leveling sensor further comprises a selective light passing object between the light source and the sample and the selective light passing object having the first pattern.

3. The system of clause 1 or 2, wherein the leveling sensor further comprises a controller having circuitry configured to:
   generate a light intensity image of the projected pattern;
   conduct a cross-correlation between the light intensity image and a reference image; and
   determine the vertical displacement of the sample based on the cross-correlation.

4. The system of clause 3, further comprising a stage motion controller having circuitry configured to adjust a height of the sample according to the determined vertical displacement.

5. The system of clause 3 or 4, wherein the reference image is obtained by projecting the first pattern on a surface of a reference sample.

6. The system of any one of clauses 3-5, wherein the cross-correlation has a ratio of a biggest peak value of the cross-correlation to a second biggest peak value equal to or greater than a predetermined threshold.

7. The system of any one of clauses 1-6, wherein the irregularity comprises a variable period along a first axis.

8. The system of any one of clauses 1-6, wherein the irregularity comprises a localized feature.

9. The system of any one of clauses 1-6, wherein the irregularity comprises a variable period along a first axis and a second axis that intersects with the first axis.

10. A method for adjusting a sample height in a charged-particle beam inspection system comprising a leveling sensor, the method comprising:
   generating a light intensity image of a projected pattern on a sample, wherein the projected pattern is formed by projecting a first pattern on the sample by a light source of the leveling sensor;
   conducting a cross-correlation between the light intensity image and a reference image; and
   determining a vertical displacement of the sample based on the cross-correlation,
   wherein the first pattern comprises an irregularity to enable a determination of the vertical displacement of the sample.

11. The method of clause 10, further comprising adjusting a height of the sample according to the determined vertical displacement.

12. The method of clause 10 or 11, further comprising: obtaining the reference image by projecting the first pattern on a surface of a reference sample.

13. The method of any one of clauses 10-12, wherein the cross-correlation has a ratio of a biggest peak value of the cross-correlation to a second biggest peak value equal to or greater than a predetermined threshold.

14. The method of any one of clauses 10-13, wherein the irregularity comprises a variable period along a first axis.

15. The method of any one of clauses 10-13, wherein the irregularity comprises a localized feature.

16. The method of any one of clauses 10-13, wherein the irregularity comprises a variable period along a first axis and a second axis that intersects with the first axis.

17. A non-transitory computer readable medium that stores a set of instructions that is executable by at least one processor of a computing device to cause the computing device to perform a method for adjusting a sample height in a charged-particle beam inspection system comprising a leveling sensor, the method comprising:
  generating a light intensity image of a projected pattern on a sample, wherein the projected pattern is formed by projecting a first pattern on the sample by a light source of the leveling sensor;
  conducting a cross-correlation between the light intensity image and a reference image; and
  determining a vertical displacement of the sample based on the cross-correlation,
  wherein the first pattern comprises an irregularity to enable a determination of the vertical displacement of the sample.

18. The computer readable medium of clause 17, wherein the set of instructions that is executable by at least one processor of the computing device to cause the computing device to further perform:
  adjusting a height of the sample according to the determined vertical displacement.

19. The computer readable medium of clause 17 or 18, wherein the set of instructions that is executable by at least one processor of the computing device to cause the computing device to further perform:
  obtaining the reference image by projecting the first pattern on a surface of a reference sample.

20. The computer readable medium of any one of clauses 17-19, wherein the cross-correlation has a ratio of a biggest peak value of the cross-correlation to a second biggest peak value equal to or greater than a predetermined threshold.

21. The computer readable medium of any one of clauses 17-20, wherein the irregularity comprises a variable period along a first axis.

22. The computer readable medium of any one of clauses 17-20, wherein the irregularity comprises a localized feature.

23. The computer readable medium of any one of clauses 17-20, wherein the irregularity comprises a variable period along a first axis and a second axis that intersects with the first axis.

24. A leveling sensor comprising:
  a light source configured to project a first pattern onto a sample; and
  a detector configured to capture an image of a projected pattern after the first pattern is projected on the sample, wherein the first pattern comprises an irregularity to enable a determination of vertical displacement of the sample.

25. The leveling sensor of clause 24, further comprising a selective light passing object between the light source and the sample and the selective light passing object having the first pattern.

26. The leveling sensor of clause 24 or 25, further comprising a controller having circuitry configured to:
  generate a light intensity image of the projected pattern;
  conduct a cross-correlation between the light intensity image and a reference image; and
  determine a vertical displacement of the sample based on the cross-correlation.

27. The leveling sensor of clause 26, further comprising a stage motion controller having circuitry configured to adjust a height of the sample according to the determined vertical displacement.

28. The leveling sensor of clause 26 or 27, wherein the reference image is obtained by projecting the first pattern on a surface of a reference sample.

29. The leveling sensor of any one of clauses 26-28, wherein the cross-correlation has a ratio of a biggest peak value of the cross-correlation to a second biggest peak value equal to or greater than a predetermined threshold.

30. The leveling sensor of any one of clauses 24-29, wherein the irregularity comprises a variable period along a first axis.

31. The leveling sensor of any one of clauses 24-29, wherein the irregularity comprises a localized feature.

32. The leveling sensor of any one of clauses 24-29, wherein the irregularity comprises a variable period along a first axis and a second axis that intersects with the first axis.

A non-transitory computer readable medium may be provided that stores instructions for a processor of a controller (e.g., controller 50 of FIG. 1) to carry out, among other things, image inspection, image acquisition, stage positioning, beam focusing, electric field adjustment, beam bending, condenser lens adjusting, activating charged-particle source, beam deflecting, and methods 900 and 1000. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

It will be appreciated that the embodiments of the present disclosure are not limited to the exact construction that has been described above and illustrated in the accompanying drawings, and that various modifications and changes may be made without departing from the scope thereof. The present disclosure has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The descriptions above are intended to be illustrative, not limiting. Thus, it will be apparent to one skilled in the art that modifications may be made as described without departing from the scope of the claims set out below.

The invention claimed is:

1. A charged-particle beam inspection system comprising:
a stage configured to hold a sample; and
a leveling sensor configured to determine a vertical displacement of the sample and comprising:
 a light source configured to project a first pattern onto the sample; and
 a detector configured to capture an image of a projected pattern after the first pattern is projected on the sample,
wherein the first pattern comprises an irregularity to enable a determination of the vertical displacement of the sample.

2. The charged-particle beam inspection system of claim 1, wherein the leveling sensor further comprises a selective light passing object between the light source and the sample and the selective light passing object having the first pattern.

3. The charged-particle beam inspection system of claim 1, wherein the leveling sensor further comprises a controller having circuitry configured to:
generate a light intensity image of the projected pattern;
conduct a cross-correlation between the light intensity image and a reference image; and
determine the vertical displacement of the sample based on the cross-correlation.

4. The charged-particle beam inspection system of claim 3, further comprising a stage motion controller having circuitry configured to adjust a height of the sample according to the determined vertical displacement.

5. The charged-particle beam inspection system of claim 3, wherein the reference image is obtained by projecting the first pattern on a surface of a reference sample.

6. The charged-particle beam inspection system of claim 3, wherein the controller is configured to determine the vertical displacement of the sample further based on the cross-correlation having a ratio of a biggest peak value of the cross-correlation to a second biggest peak value equal to or greater than a predetermined threshold.

7. The charged-particle beam inspection system of claim 1, wherein the irregularity comprises a variable period along a first axis.

8. The charged-particle beam inspection system of claim 1, wherein the irregularity comprises a localized feature.

9. The charged-particle beam inspection system of claim 1, wherein the irregularity comprises a variable period along a first axis and a second axis that intersects with the first axis.

10. The charged-particle beam inspection system of claim 1, wherein the irregularity is an irregularity of a periodicity of the first pattern.

11. The charged-particle beam inspection system of claim 1, wherein the determination of the vertical displacement of the sample is a determination of a difference between an actual height of the sample and a target height of the sample.

12. A non-transitory computer readable medium that stores a set of instructions that is executable by at least one processor of a computing device to cause the computing device to perform a method for adjusting a sample height in a charged-particle beam inspection system comprising a leveling sensor, the method comprising:
generating a light intensity image of a projected pattern on a sample, wherein the projected pattern is formed by projecting a first pattern on the sample by a light source of the leveling sensor;
conducting a cross-correlation between the light intensity image and a reference image; and
determining a vertical displacement of the sample based on the cross-correlation,
wherein the first pattern comprises an irregularity to enable a determination of the vertical displacement of the sample.

13. The non-transitory computer readable medium of claim 12, wherein the set of instructions that is executable by at least one processor of the computing device to cause the computing device to further perform:
adjusting a height of the sample according to the determined vertical displacement.

14. The non-transitory computer readable medium of claim 12, wherein the set of instructions that is executable by at least one processor of the computing device to cause the computing device to further perform:
obtaining the reference image by projecting the first pattern on a surface of a reference sample.

15. The non-transitory computer readable medium of claim 12, wherein determining the vertical displacement of the sample is further based the cross-correlation has a ratio of a biggest peak value of the cross-correlation to a second biggest peak value equal to or greater than a predetermined threshold.

16. The non-transitory computer readable medium of claim 12, wherein the irregularity comprises a variable period along a first axis.

17. The non-transitory computer readable medium of claim 12, wherein the irregularity comprises a localized feature.

18. The non-transitory computer readable medium of claim 12, wherein the irregularity is an irregularity of a periodicity of the first pattern.

19. The non-transitory computer readable medium of claim 12, wherein the determination of the vertical displacement of the sample is a determination of a difference between an actual height of the sample and a target height of the sample.

* * * * *